United States Patent
Kim et al.

(10) Patent No.: US 10,448,374 B2
(45) Date of Patent: Oct. 15, 2019

(54) POWER HEADROOM REPORT METHOD OF DUAL-CONNECTIVITY UE IN MOBILE COMMUNICATION SYSTEM

(71) Applicant: Samsung Electronics Co., Ltd., Suwon-si, Gyeonggi-do (KR)

(72) Inventors: Wooseong Kim, Gwacheon-si (KR); Soenghun Kim, Suwon-si (KR); Gert-Jan Van Lieshout, Apeldoorn (NL); Jaehyuk Jang, Suwon-si (KR); Kyeongin Jeong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 162 days.

(21) Appl. No.: 14/664,096

(22) Filed: Mar. 20, 2015

(65) Prior Publication Data

US 2015/0271811 A1    Sep. 24, 2015

(30) Foreign Application Priority Data

Mar. 21, 2014  (KR) ........................ 10-2014-0033658

(51) Int. Cl.
*H04W 72/04* (2009.01)
*H04W 52/34* (2009.01)
(Continued)

(52) U.S. Cl.
CPC ..... *H04W 72/0413* (2013.01); *H04W 52/146* (2013.01); *H04W 52/34* (2013.01); *H04W 52/365* (2013.01); *H04W 72/0473* (2013.01)

(58) Field of Classification Search
None
See application file for complete search history.

(56) References Cited

U.S. PATENT DOCUMENTS 8,982,830 B2    3/2015  Kim et al.
9,185,665 B2 *  11/2015 Kim .................... H04W 52/365
(Continued)

FOREIGN PATENT DOCUMENTS

CN    102428730 A    4/2012
CN    102932892 A    2/2013
(Continued)

OTHER PUBLICATIONS

Nsn et al, PHR for dual connectivity, 3GPP Draft, R2-140139, XP050791557, Prague, Czech Republic, Feb. 9, 2014.
(Continued)

*Primary Examiner* — Mohammad S Adhami
(74) *Attorney, Agent, or Firm* — Jefferson IP Law, LLP

(57) ABSTRACT

A transmit power capability and power headroom report (PHR) method and an apparatus of a User Equipment (UE) operating in an Inter-evolved Node B (Inter-eNB) carrier aggregation or dual connectivity mode for use in a mobile communication system are provided. The transmit power capability and PHR method includes receiving configuration information for at least one medium access control (MAC) entity for transmitting and receiving a signal; receiving uplink resource allocation information for a first MAC entity included in the at least one MAC entity; and transmitting, if change of measurement on one of the at least one MAC entity is equal to or greater than a threshold, a power headroom report (PHR) on an uplink resource corresponding to the first MAC entity based on the uplink resource allocation information.

11 Claims, 23 Drawing Sheets

(51) Int. Cl.
*H04W 52/36* (2009.01)
*H04W 52/14* (2009.01)

(56) References Cited

U.S. PATENT DOCUMENTS

| | | | |
|---|---|---|---|
| 9,439,159 B2* | 9/2016 | Kim | H04W 52/365 |
| 2009/0245191 A1 | 10/2009 | Ball et al. | |
| 2010/0238830 A1 | 9/2010 | Kim et al. | |
| 2011/0292874 A1 | 12/2011 | Ho et al. | |
| 2012/0113845 A1 | 5/2012 | Kim et al. | |
| 2012/0176967 A1 | 7/2012 | Kim et al. | |
| 2012/0178494 A1* | 7/2012 | Haim | H04W 52/365 455/522 |
| 2012/0196645 A1 | 8/2012 | Kim et al. | |
| 2012/0207112 A1* | 8/2012 | Kim | H04W 52/146 370/329 |
| 2013/0121297 A1 | 5/2013 | Kim et al. | |
| 2013/0127367 A1 | 5/2013 | Esaki et al. | |
| 2014/0177467 A1 | 6/2014 | Kim et al. | |
| 2015/0003371 A1* | 1/2015 | Park | H04W 52/0238 370/329 |
| 2015/0195796 A1* | 7/2015 | Sivanesan | H04W 52/365 370/329 |
| 2015/0319716 A1* | 11/2015 | Park | H04W 16/32 370/329 |
| 2015/0382311 A1* | 12/2015 | Kim | H04W 52/365 370/329 |
| 2015/0382312 A1* | 12/2015 | Kim | H04W 52/365 370/252 |
| 2015/0382313 A1* | 12/2015 | Kim | H04W 52/365 370/252 |
| 2016/0142984 A1* | 5/2016 | Lee | H04W 52/365 370/329 |
| 2016/0227505 A1* | 8/2016 | Loehr | H04W 56/0005 |
| 2017/0034866 A1* | 2/2017 | Wager | H04W 76/025 |
| 2017/0111873 A1* | 4/2017 | Kakishima | H04W 52/146 |

FOREIGN PATENT DOCUMENTS

| | | |
|---|---|---|
| CN | 102934499 A | 2/2013 |
| CN | 103190103 A | 7/2013 |
| CN | 103202083 A | 7/2013 |
| CN | 103299690 A | 9/2013 |
| KR | 10-2011-0050311 A | 5/2011 |
| KR | 10-2013-0127367 A | 11/2013 |
| RU | 2 477 000 C2 | 2/2013 |
| WO | 2013/027987 A2 | 2/2013 |
| WO | 2015/102747 A1 | 7/2015 |
| WO | 2015/137661 A1 | 9/2015 |

OTHER PUBLICATIONS

Intel Corporation, PHR for Dual Connectivity, 3GPP Draft, R2-140283, XP050791678, Prague, Czech Republic, Feb. 9, 2014.
Samsung, UL Power Control for Dual Connectivity, R1-140375, 3GPP TSG RAN WG1 #76, Prague, Czech Republic, Feb. 1, 2014.
Ericsson, Power control on dual connectivity, R1-140762, 3GPP TSG RAN WG1 Meeting #76, Prague, Czech Republic, Jan. 31, 2014.
Samsung, "Power headroom report for dual connectivity", 3GPP TSG RAN WG2 #85, R2-140328, Prague, Czech Republic, Feb. 10-14, 2014.
Chinese Office Action dated Mar. 22, 2019, issued in Chinese Application No. 201580019094.X.

* cited by examiner

FIG. 8A

| $C_7$ | $C_6$ | $C_5$ | $C_4$ | $C_3$ | $C_2$ | $C_1$ | R |
|---|---|---|---|---|---|---|---|
| P | V | \multicolumn{6}{c}{PH (Type 2, PCell)} |
| R | R | \multicolumn{6}{c}{$P_{CMAX,c}$ 1} |
| P | V | \multicolumn{6}{c}{PH (Type 1, PCell)} |
| R | R | \multicolumn{6}{c}{$P_{CMAX,c}$ 2} |
| P | V | \multicolumn{6}{c}{PH (Type 2, PSCell)} |
| R | R | \multicolumn{6}{c}{$P_{CMAX,c}$ 3} |
| P | V | \multicolumn{6}{c}{PH (Type 1, PSCell)} |
| R | R | \multicolumn{6}{c}{$P_{CMAX,c}$ 4} |
| P | V | \multicolumn{6}{c}{PH (Type 1, SCell 1)} |
| R | R | \multicolumn{6}{c}{$P_{CMAX,c}$ 5} |

...

| P | V | PH (Type 1, SCell n) |
|---|---|---|
| R | R | $P_{CMAX,c}$ m |

FIG. 8B

| C₇ | C₆ | C₅ | C₄ | C₃ | C₂ | C₁ | R |
|----|----|----|----|----|----|----|---|
| P | V | \multicolumn{6}{c}{PH (Type 2, PCell)} | | | | | |

| C₇ | C₆ | |
|---|---|---|
| P | V | PH (Type 2, PCell) |
| R | R | $P_{CMAX,c}$ 1 |
| P | V | PH (Type 1, PCell) |
| R | R | $P_{CMAX,c}$ 2 |
| P | V | PH (Type 1, SCell 1) |
| R | R | $P_{CMAX,c}$ 3 |

...

| | | |
|---|---|---|
| P | V | PH (Type 2, PSCell) |
| R | R | $P_{CMAX,c}$ m-2 |
| P | V | PH (Type 1, PSCell) |
| R | R | $P_{CMAX,c}$ m-1 |
| P | V | PH (Type 1, SCell n) |
| R | R | $P_{CMAX,c}$ m |

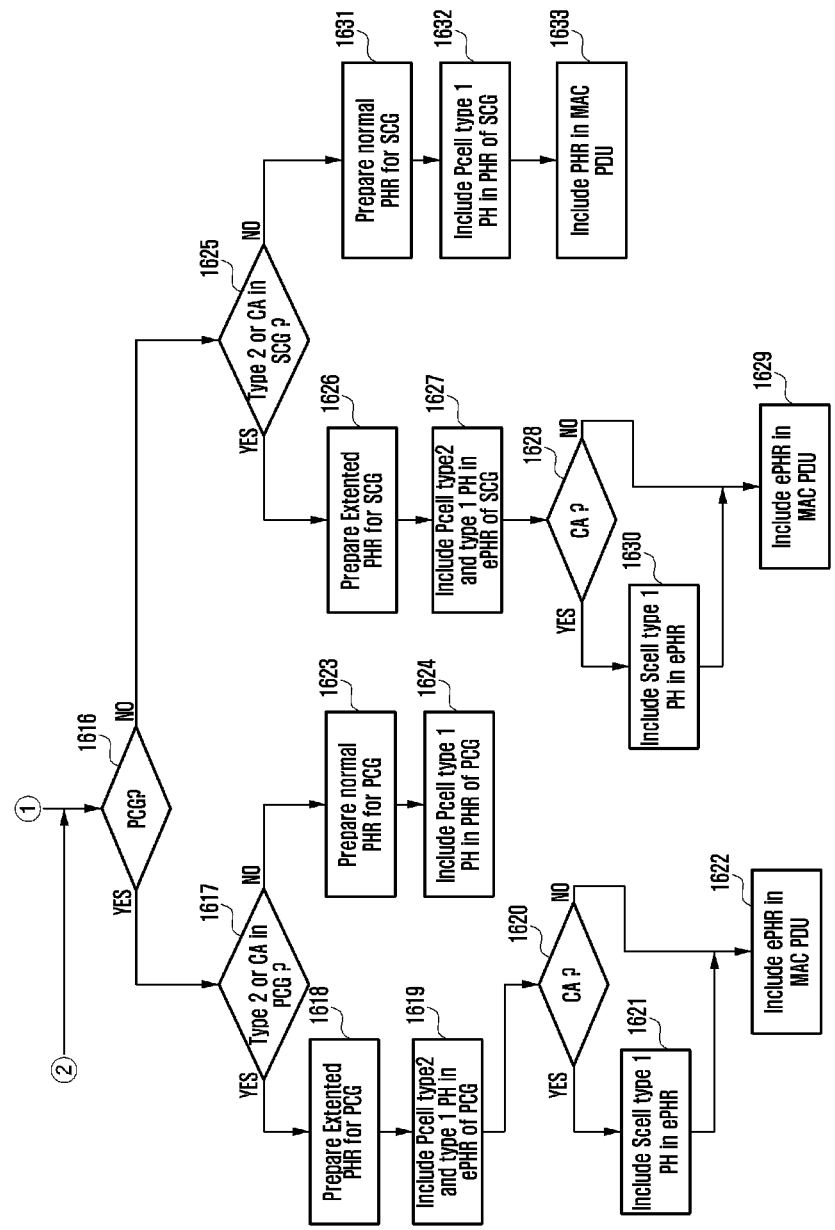

FIG. 17B

| $C_7$ | $C_6$ | $C_5$ | $C_4$ | $C_3$ | $C_2$ | $C_1$ | T |
|---|---|---|---|---|---|---|---|
| P | V | \multicolumn{6}{l|}{PH (Type 2, PCell)} |
| R | R | \multicolumn{6}{l|}{$P_{CMAX,c}$ 1} |
| P | V | \multicolumn{6}{l|}{PH (Type 2, PSCell)} |
| R | R | \multicolumn{6}{l|}{$P_{CMAX,c}$ 2} |
| P | V | \multicolumn{6}{l|}{PH (Type 1, PCell)} |
| R | R | \multicolumn{6}{l|}{$P_{CMAX,c}$ 3} |
| P | V | \multicolumn{6}{l|}{PH (Type 1, PSCell)} |
| R | R | \multicolumn{6}{l|}{$P_{CMAX,c}$ 4} |
| P | V | \multicolumn{6}{l|}{PH (Type 1, SCell 1)} |
| R | R | \multicolumn{6}{l|}{$P_{CMAX,c}$ 5} |

...

| P | V | PH (Type 1, SCell n) |
|---|---|---|
| R | R | $P_{CMAX,c}$ m |

FIG. 17C

| $C_7$ | $C_6$ | $C_5$ | $C_4$ | $C_3$ | $C_2$ | $C_1$ | R |
|---|---|---|---|---|---|---|---|
| P | V | \multicolumn{6}{c}{PH (Type 2, PCell)} |
| R | R | \multicolumn{6}{c}{$P_{CMAX,c}$ 1} |
| P | V | \multicolumn{6}{c}{PH (Type 2, PSCell)} |
| R | R | \multicolumn{6}{c}{$P_{CMAX,c}$ 2} |
| P | V | \multicolumn{6}{c}{PH (Type 1, PCell)} |
| R | R | \multicolumn{6}{c}{$P_{CMAX,c}$ 3} |
| P | V | \multicolumn{6}{c}{PH (Type 1, Serving Cell 1)} |
| R | R | \multicolumn{6}{c}{$P_{CMAX,c}$ 4} |
| P | V | \multicolumn{6}{c}{PH (Type 1, Serving Cell 2)} |
| R | R | \multicolumn{6}{c}{$P_{CMAX,c}$ 5} |

...

| P | V | PH (Type 1, Serving Cell n) |
|---|---|---|
| R | R | $P_{CMAX,c}$ m |

POWER HEADROOM REPORT METHOD OF DUAL-CONNECTIVITY UE IN MOBILE COMMUNICATION SYSTEM

CROSS-REFERENCE TO RELATED APPLICATION(S)

This application claims the benefit under 35 U.S.C. § 119(a) of a Korean patent application filed on Mar. 21, 2014 in the Korean Intellectual Property Office and assigned Serial number 10-2014-0033658, the entire disclosure of which is hereby incorporated by reference.

TECHNICAL FIELD

The present disclosure relates to a transmit power capability and Power Headroom Report (PHR) method and apparatus of a User Equipment (UE) operating in an Inter-evolved Node B (Inter-eNB) carrier aggregation or dual connectivity mode in a mobile communication system.

BACKGROUND

Mobile communication systems were developed to provide mobile users with communication services. With the rapid advance of technologies, the mobile communication systems have evolved to the level capable of providing high speed data communication service beyond the early voice-oriented services.

Recently, standardization for a Long Term Evolution (LTE) system, as one of the next-generation mobile communication systems, is underway in the $3^{rd}$ Generation Partnership Project (3GPP). LTE is a technology for realizing high-speed packet-based communications with the data rate of up to 100 Mbps, which is higher than the currently available data rate.

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beam-forming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In line with the completion of the LTE standardization, an LTE-Advanced (LTE-A) system is now under discussion, which improves a data rate by adopting the LTE communication system with several new technologies. One of such technologies is Carrier Aggregation. The Carrier Aggregation is a technology allowing a User Equipment (UE) to use multiple downlink carriers and multiple uplink carriers, unlike the conventional technology of using one downlink carrier and one uplink carrier, for data communication.

The current release of LTE-A specifies only an intra-evolved Node B (intra-eNB) carrier aggregation. This diminishes the applicability of carrier aggregation function and is likely to cause carrier aggregation failure especially in a scenario where a plurality of pico cells and one macro cell coexist. In order to solve this problem, a new study item called 'small cell enhancement' is being discussed in 3GPP Rel-12. This study item aims to enable inter-eNB carrier aggregation technique for guaranteeing a high data rate to a UE by aggregating the serving cells belonging to the different eNBs or dual connectivity technique (hereinafter, these techniques are referred integrally to as 'dual connectivity'). Although other mobility-related fields are being discussed actively, the dual connectivity technique, which allows carrier aggregation between macro and pico (or small) cells, is likely to affect significantly to the future communication technologies. With the increase of the mobile data traffic due to the widespread use of the smartphone, it is expected that the market share of the small cell eNBs capable of accommodating UEs independently increases along with the small cell deployment using legacy Remote Radio Head (RRH). In the case that a UE connects to a small cell for data communication, it may receive other types of data from the macro eNB simultaneously.

Since the transmit power of the UE is determined depending on the type of the UE in the legacy communication system, the eNB receives the UE headroom power report periodically or according to an event (e.g. pathloss) and manages uplink resource of the UE efficiently based thereon.

In the case that the UE is transmitting uplink data at the maximum allowed power, although the eNB which is not aware thereof increases the uplink radio resource for the current UE, the UE cannot use corresponding resource efficiently due to the lack of transmit power. In the mobile communication system supporting the dual connectivity, it is necessary for the UE to report the transmit power information for a plurality of eNBs respectively unlike the legacy UE reports the transmit power information to a single eNB. However, the current standard does not specify any transmit power reporting scheme of the UE operating in the inter-eNB carrier aggregation or dual connectivity mode and therefore there is a need of a method of reporting the transmit power report of a UE operating in the dual connectivity mode.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an enhanced Power Headroom Report (PHR) method and apparatus for controlling the transmit power of the User Equipment (UE) operating in the dual connectivity mode in a mobile communication system.

In accordance with an aspect of the present disclosure, a signal transmission/reception method of a terminal in a mobile communication system is provided. The signal transmission/reception method includes receiving configuration information for at least one medium access control (MAC) entity for transmitting and receiving a signal; receiving uplink resource allocation information for a first MAC entity included in the at least one MAC entity; and transmitting, if change of measurement on one of the at least one MAC entity is equal to or greater than a threshold, a power headroom report (PHR) on an uplink resource corresponding to the first MAC entity based on the uplink resource allocation information.

In accordance with another aspect of the present disclosure, a signal transmission/reception method of a base station in a mobile communication system is provided. The signal transmission/reception method includes transmitting configuration information for at least one medium access control (MAC) entity to a terminal; transmitting uplink resource allocation information for a first MAC entity included in the at least one MAC entity to the terminal; receiving, if the change of measurement on one of the at least one MAC entity is equal to or greater than a threshold, a power headroom report (PHR) from the terminal on an uplink resource corresponding to the first MAC entity based on the uplink resource allocation information.

In accordance with another aspect of the present disclosure, a terminal of transmitting/receiving signals in a mobile communication system is provided. The terminal includes a transceiver for transmitting and receiving a signal; and a controller configured to control the transceiver to: receive configuration information for at least one medium access control (MAC) entity for transmitting and receiving a signal, receive uplink resource allocation information for a first MAC entity included in the at least one MAC entity, and transmit, if change of measurement on one of the at least one MAC entity is equal to or greater than a threshold, a power headroom report (PHR) on an uplink resource corresponding to the first MAC entity based on the uplink resource allocation information.

In accordance with another aspect of the present disclosure, a base station of transmitting/receiving signals in a mobile communication system is provided. The base station includes a transceiver for transmitting and receiving a signal; and a controller configured to control the transceiver to: transmit configuration information for at least one medium access control (MAC) entity to a terminal, transmit uplink resource allocation information for a first MAC entity included in the at least one MAC entity to the terminal, and receive, if the change of measurement on one of the at least one MAC entity is equal to or greater than a threshold, a power headroom report (PHR) from the terminal on an uplink resource corresponding to the first MAC entity based on the uplink resource allocation information.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 8A is a diagram illustrating a PHR format for a dual connectivity-enabled UE to transmit the PH information for all serving cells to the macro cell eNB (MeNB) and SeNB according to an embodiment of the present disclosure;

FIG. 8B is a diagram illustrating a PHR format for a dual connectivity-enabled UE to transmit the PH information for serving cells to the MeNB and SeNB according to an embodiment of the present disclosure;

FIGS. 16A and 16B are flowcharts illustrating the operation procedure of the UE with the triggering condition in the double triggering scheme according to various embodiments of the present disclosure; and FIGS. 17A, 17B, and 17C are diagrams illustrating PHR formats transmitted from a UE to an eNB according to various embodiments of the present disclosure.

Throughout the drawings, it should be noted that like reference numbers are used to depict the same or similar elements, features, and structures.

DETAILED DESCRIPTION

Figure 1:
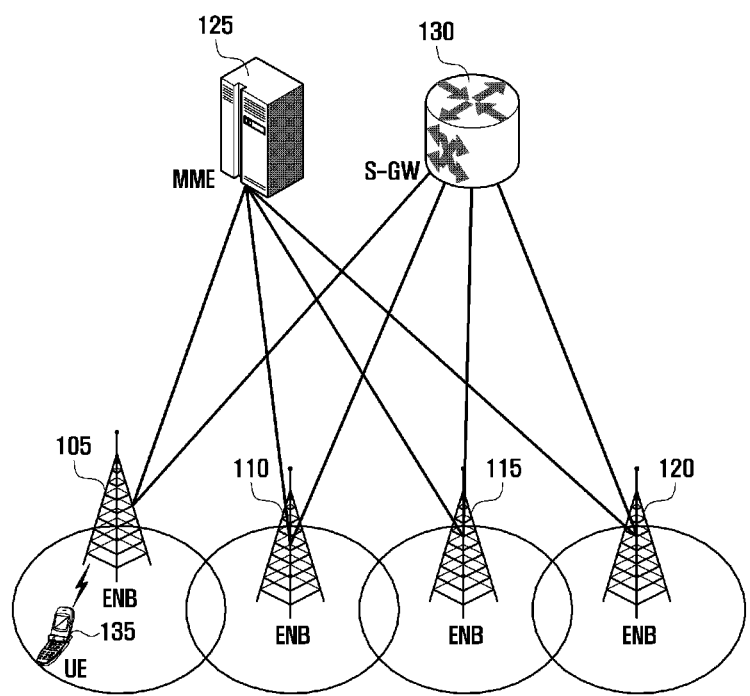
FIG. 1 is a diagram illustrating the architecture of a Long Term Evolution (LTE) system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operations to be performed on the computer or other programmable apparatus to produce a computer implemented process such that the instructions which execute on the computer or other programmable apparatus provide operations for implementing the functions/acts specified in the flowchart and/or block diagram block or blocks.

Furthermore, the respective block diagrams may illustrate parts of modules, segments or codes including at least one or more executable instructions for performing specific logic function(s). Moreover, it should be noted that the functions of the blocks may be performed in different order in several modifications. For example, two successive blocks may be performed substantially at the same time, or may be performed in reverse order according to their functions.

The term "module" according to various embodiments of the present disclosure, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more Central Processing Units (CPUs) in a device or a secure multimedia card.

Detailed description of well-known functions and structures incorporated herein may be omitted to avoid obscuring the subject matter of the present disclosure. Various embodiments of the present disclosure are described with reference to the accompanying drawings in detail. Prior to the explanation of the present disclosure, a description is briefly made of the Long Term Evolution (LTE) system and carrier aggregation.

FIG. 1 is a diagram illustrating the architecture of an LTE system according to an embodiment of the present disclosure.

Referring to FIG. 1, the radio access network of the LTE system includes evolved Node Bs (eNBs) 105, 110, 115, and 120, a Mobility Management Entity (MME) 125, and a Serving-Gateway (S-GW) 130. The User Equipment (UE) 135 connects to an external network via the eNBs 105, 110, 115, and 120 and the S-GW 130.

Referring to FIG. 1, the eNBs 105, 110, 115, and 120 correspond to the legacy node Bs of the UMTS system. The eNBs 105, 110, 115, and 120 allow the UE 135 to establish a radio channel and are responsible for functions more complicated as compared to the legacy node B. In the LTE system, all the user traffic services including real time services such as Voice over Internet Protocol (VoIP) are provided through a shared channel and thus there is a need for a device to schedule data based on the state information (such as buffer status, power headroom (PH) status, and channel condition of the UE), the eNBs 105, 110, 115, and 120 being responsible for such functions. Typically, one eNB controls a plurality of cells. In order to secure the data rate of up to 100 Mbps, the LTE system adopts Orthogonal Frequency Division Multiplexing (OFDM) as a radio access technology.

Also, the LTE system adopts Adaptive Modulation and Coding (AMC) to determine the modulation scheme and channel coding rate in adaptation to the channel condition of the UE.

The S-GW 130 is an entity to provide data bearers so as to establish and release data bearers under the control of the MME 125. The MME 125 is responsible for mobility management of UEs and various control functions and may be connected to a plurality of eNBs.

Figure 2:
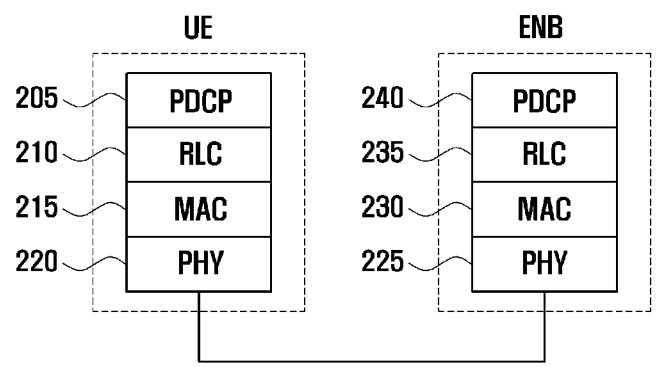
FIG. 2 is a diagram illustrating a protocol stack of the LTE system according to an embodiment of the present disclosure.

FIG. 2 is a diagram illustrating a protocol stack of the LTE system according to an embodiment of the present disclosure.

Referring to FIG. 2, the protocol stack of the LTE system includes at least one of Packet Data Convergence Protocol (PDCP) 205 and 240, Radio Link Control (RLC) 210 and 235, Medium Access Control (MAC) 215 and 230, and Physical (PHY) 220 and 225.

The PDCP 205 and 240 is responsible for IP header compression/decompression, and the RLC 210 and 235 is responsible for segmenting the PDCP Protocol Data Unit (PDU) into segments in appropriate size for Automatic Repeat Request (ARQ) operation.

The MAC 215 and 230 is responsible for establishing connection to a plurality of RLC entities so as to multiplex the RLC PDUs into MAC PDUs and demultiplex the MAC PDUs into RLC PDUs. The PHY 220 and 225 performs channel coding on the MAC PDU and modulates the MAC PDU into OFDM symbols to transmit over radio channel or performs demodulating and channel-decoding on the received OFDM symbols and delivers the decoded data to the higher layer.

Figure 3:
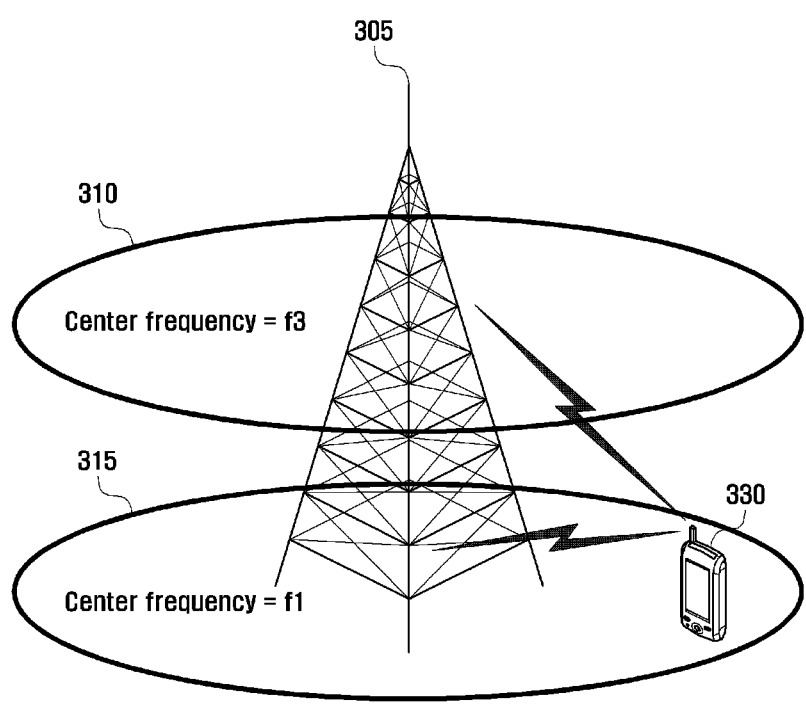
FIG. 3 is a diagram illustrating intra-evolved Node B (intra-eNB) carrier aggregation in an LTE-Advanced (LTE-A) system according to an embodiment of the present disclosure.

FIG. 3 is a diagram illustrating intra-eNB carrier aggregation according to an embodiment of the present disclosure.

Referring to FIG. 3, an eNB transmits and receives signals through multiple carriers across a plurality of frequency bands. For example, the eNB 305 can be configured to use the carrier 315 with center frequency at f1 and the carrier 310 with center frequency at f3. If carrier aggregation is not supported, the UE 330 has to transmit/receive data using one of the carriers 310 and 315. However, the UE 330 having the carrier aggregation capability can transmit/receive data using both the carriers 310 and 315.

The eNB 305 can increase the amount of the resource to be allocated to the UE 330 having the carrier aggregation capability in adaptation to the channel condition of the UE 330 so as to improve the data rate of the UE 330. As described above, aggregating the downlink carriers or the uplink carriers is referred to as carrier aggregation.

Depending on the case, however, it may be necessary to aggregate the downlink carriers or uplink carriers of different eNBs unlike the case of FIG. 3.

Figure 4:
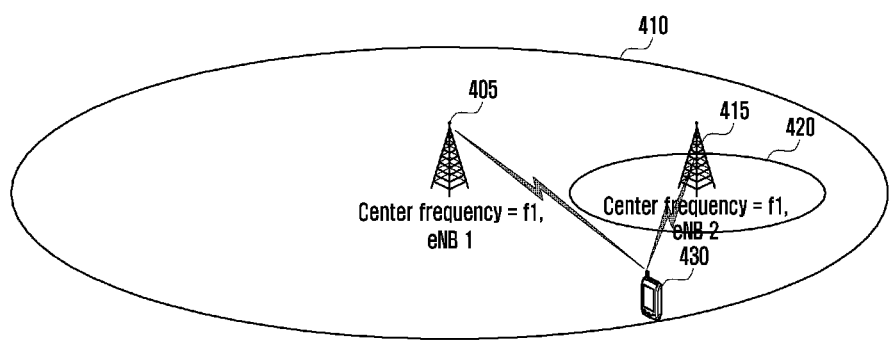
FIG. 4 is a diagram illustrating inter-eNB carrier aggregation (dual connectivity) according to various embodiments of the present disclosure.

FIG. 4 is a diagram illustrating inter-eNB carrier aggregation (dual connectivity) according to various embodiments of the disclosure.

Referring to FIG. 4, when the eNB 1 (macro cell eNB (MeNB)) 405 and the eNB 2 (small cell eNB (SeNB)) 415 are operating carriers with the center frequencies at f1 and f2 respectively, the UE 430 may aggregate the downlink carriers with the respective center frequencies at f1 and f2 and, in the present disclosure, such carrier aggregation is referred to as inter-eNB carrier aggregation or dual connectivity in the present disclosure.

The following definitions are provided to facilitate understanding of certain terms used frequently herein.

Assuming that a cell is configured with one downlink carrier and one uplink carrier of an eNB in the conventional concept, the carrier aggregation can be understood as if the UE communicates data via multiple cells. At this time, the peak data rate and the number of aggregated carriers have positive correlation.

If a UE receives data on a downlink carrier or transmits data on an uplink carrier, this means that the UE transmits/receives the control and data channels provided by the cell corresponding to the center frequency and frequency band characterizing the carriers. In the 3GPP Release 10 Standard, the carrier aggregation has the same meaning as configuring a plurality of serving cells including a primary serving cell (PCell) and at least one secondary serving cell (SCell) classified depending on their roles. The PCell is the serving cell which is responsible for network connection and mobility of the UE, and the SCell is the serving cell which is configured additionally for carrier aggregation to increase downlink/uplink data rate of the UE.

The serving cells can be grouped in the dual connectivity mode as follows. The serving cells of the macro eNB (PCell and SCells for carrier aggregation) are grouped into a primary cell group (PCG), and the serving cells (SCells) of the small cell are grouped into a secondary cell group (SCG). The PCG is a set of the serving cells controlled by the macro eNB (hereinafter, referred interchangeably with 'master eNB' and 'MeNB') controlling the PCell, and the SCG is a set of the serving cells controlled by the eNB having no PCell (hereinafter, referred to as secondary eNB or SeNB). The eNB may notify the UE whether a serving cell belongs to the PCG or SCG in the procedure of configuring the corresponding serving cell. In the following description, the term PCG is be interchangeably referred to as Master Cell Group (MCG).

The main purpose of using these terms is to distinguish the cell controlled by the eNB controlling the PCell of a specific UE from other cells, and the UE and the corresponding cell may operate differently depending on whether the cell is under the control of the MeNB controlling the PCell of the specific UE or under the control of an SeNB.

Figure 5:
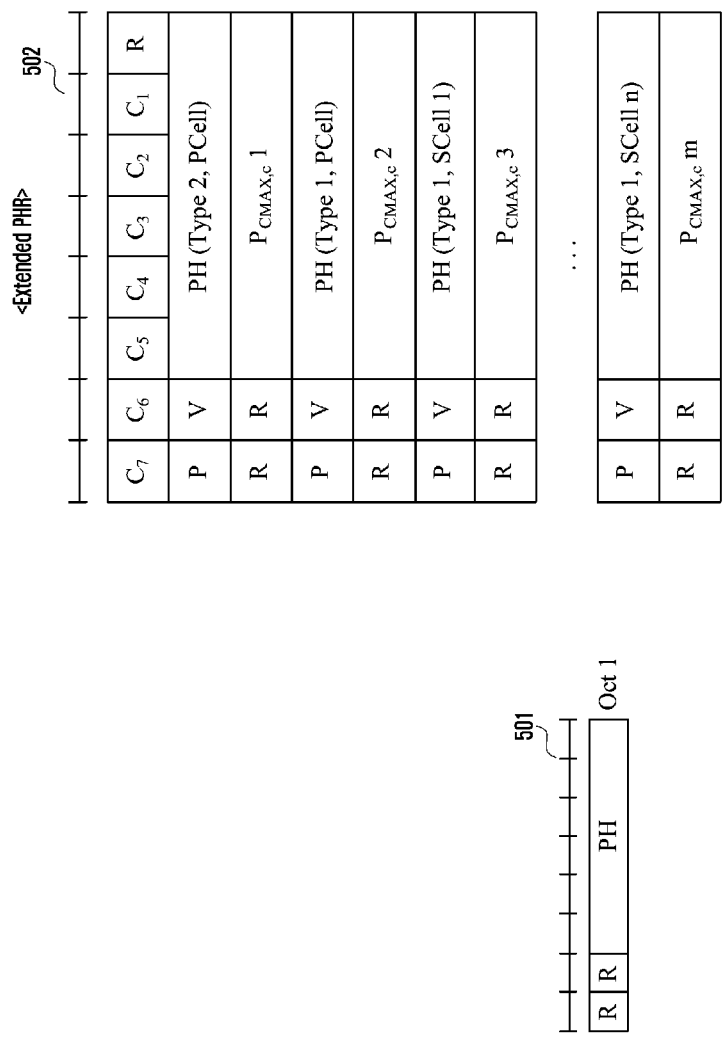
FIG. 5 is a diagram illustrating a Power Headroom Report (PHR) message format for reporting the power headroom PH of the User Equipment (UE) for uplink transmit power control according to an embodiment of the present disclosure.

FIG. 5 is a diagram illustrating a Power Headroom Report (PHR) message format for reporting the PH of the UE for uplink transmit power control according to an embodiment of the present disclosure.

Referring to FIG. 5, the PHR format is classified into one of normal type 501 and an extended type 502.

The normal PHR format 501 includes the information on the PH of the UE in the current serving cell. In LTE-Advanced (LTE-A) adopting the Carrier Aggregation (CA)

function, the UE is capable of attaching up to five (5) serving cells simultaneously for communication. Thus the legacy format for including the PH level information in one cell is extended to the new PHR format 502.

The first octet of the extended PHR 502 is the bitmap indicating presence/absence of serving cells, the next octet contains the PH information necessary for type 2 transmission in the PCell, and the rest of the extended PHR contains the PH information necessary for type 1 transmission in the PCell. The type 2 transmission is the PH level information for the case where both the Physical Uplink Control Channel (PUCCH) and Physical Uplink Shared Channel (PUSCH) are transmitted in the subframe simultaneously, and type 1 is the PH level information for the case where only the PUSCH is transmitted.

The PCell PH information is arranged first, followed by the PH information for the SCell designated in the first octet. The PHR also includes the maximum transmit power (PC-max) allowed in the cell along with the PH information.

The current PHR format is not designed so as to report two PHs for multiple serving cell groups (PCG and SCG) in the dual connectivity mode. Thus the present disclosure proposes a method and apparatus for reporting the PHs of the respective cell groups in the dual connectivity mode by using the new PHR format along with the legacy format.

Figure 6:
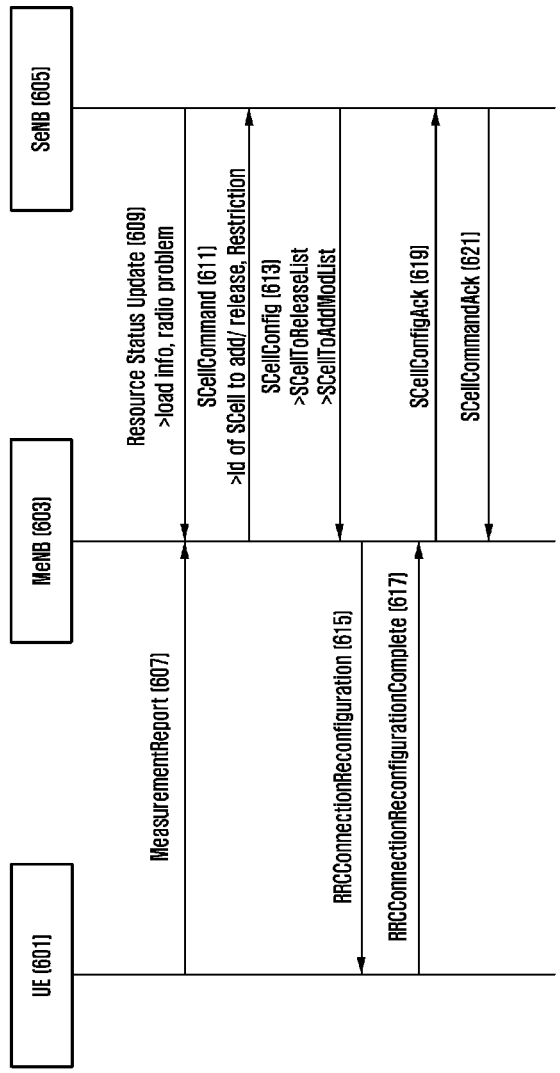
FIG. 6 is a signal flow diagram illustrating a dual connectivity configuration procedure of a small cell eNB (SeNB) according to an embodiment of the present disclosure.

FIG. 6 is a signal flow diagram illustrating a dual connectivity configuration procedure of an SeNB according to an embodiment of the present disclosure.

FIG. 6 shows the signal flows between a UE 601, an MeNB 603, and an SeNB 605.

The UE 601 may measure at least one of the signals of the small cell and the macro cell and reports the measurement result to the MeNB 603 using a measurement report message at operation 607. The measurement report is a UE operation specified in the LTE standard and may include reporting the measurement result made according to a rule designated by the eNB. The MeNB 603 may perform a handover procedure for the UE 601 or schedules the resources appropriately based on the measurement result. This procedure is defined as Radio Resource Management (RRM). Dual connectivity is a technology allowing a UE to connect to two different eNBs, i.e. an MeNB and an SeNB, simultaneously. The UE 601 operating in the dual connectivity mode can connect to the MeNB 603 and the SeNB 650 simultaneously.

In the dual connectivity mode, the eNB which manages the RRM of the UE 601 is the MeNB 603. Accordingly, the UE 601 reports neighbor cell measurement values periodically to the MeNB 603.

The SeNB 605 reports its resource use status, such as Physical Resource Block (PBR) utilization and transmission power to the MeNB 603 periodically at operation 609. The MeNB 603 determines whether to use a secondary cell of the SeNB 605 based on the resource use status information.

If it is determined to add a cell of the SeNB 605 as the secondary cell based on the reported information, the MeNB 603 sends the SeNB 605 an SCellCommand message through the X2 interface at operation 611. The SCellCommand message may include the information indicating the SCell of the SeNB 605 to be added or released.

Upon receipt of the SCellCommand message, the SeNB 605 sends the MeNB 603 an SCellConfig message including RRC reconfiguration information at operation 613. The RRC reconfiguration information informs of the serving cell of the SeNB 605 to be added or released. In an embodiment of the present disclosure, the SCellConfig message may be one of the RRC messages specified in the LTE Standard or the information on the RRC message to be generated by the MeNB 603. In an embodiment of the present disclosure, if the SCellConfig message is an RRC message for the UE 601, the MeNB 603 just forwards the message to the UE 601.

Otherwise, the MeNB 603 generates the RRC reconfiguration message based on the corresponding message. The MeNB 603 sends the UE 601 the RRC reconfiguration message to add or release the serving cell of the SeNB 605 at operation 615 and receives a response message (RRCConnectionReconfigurationComplete) message from the UE 601 at operation 617. In an embodiment of the present disclosure, the message transmission procedure is performed as specified in the LTE standard.

The UE 601 may perform an attachment to or release from the SeNB 605 through the above procedure. The SCellConfig message may include the information on a specific serving cell for transmitting PUCCH or Random Access Channel (RACH).

In an embodiment of the present disclosure, the serving cell is referred to as a primary SCell (pSCell) or a special SCell which is distinguished from other SCells. Other SCells have neither PUCCH nor RACH, and the acknowledgement corresponding to downlink data is transmitted through the pSCell. If the RRC message is received at operation 615, the UE 601 performs a random access procedure in the pSCell to add the serving cell of the SeNB 605 initially. The random access procedure may include at least one of acquiring uplink synchronization with the serving cell of the SeNB 605 and determining uplink transmit power and requesting for initial uplink resource.

The MeNB 603 and the SeNB 605 exchange the acknowledgements corresponding to the received messages at operations 619 and 621.

Referring to FIG. 6, in order to add a serving cell of the SeNB 605 for small cell offloading, the MeNB 603 needs the signal strength values of the serving cells that are measured by the UE 601 and the SeNB status information transmitted by the SeNB 605 at operation 609. In this embodiment of the present disclosure, however, the two values are not related to each other, and the UE 601 has no eNB status information of the SeNB 605.

Figure 7:
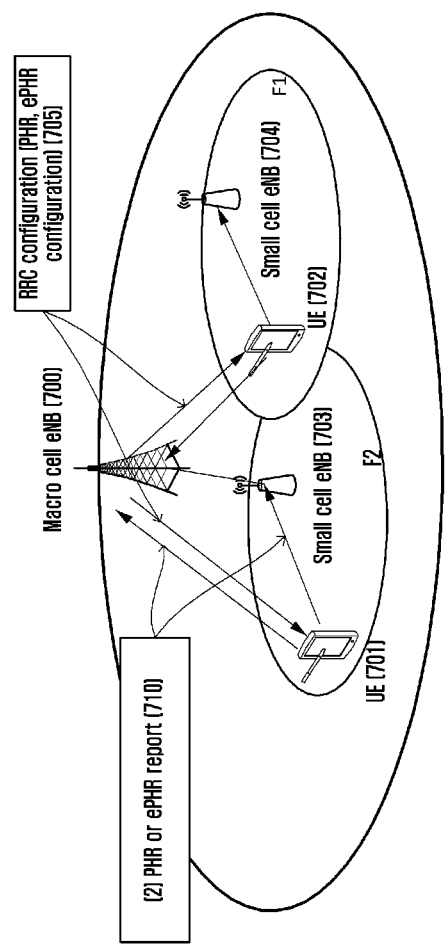
FIG. 7 is a diagram illustrating the operations of the eNB and UE for PHR in the dual connectivity environment according to an embodiment of the present disclosure.

FIG. 7 is a diagram illustrating the operations of the eNB and UE for PHR in the dual connectivity environment according to an embodiment of the present disclosure.

Referring to FIG. 7, in the environment where the MeNB 700 and the SeNB 703 coexist, the MeNB 700 sends the UEs 701 and 702 the PH or transmit power margin configuration information through a higher layer RRC message as denoted by reference number 705.

In an embodiment of the present disclosure, the MeNB 700 may configure whether to use the normal PHR 501 or the extended PHR 502 of FIG. 5 to the UEs, depending on whether the UEs 701 and 702 are capable of transmitting both the PUCCH and PUSCH in the same subframe or whether the UEs 701 and 702 support LTE-A carrier aggregation or carrier aggregation is in use.

Thus the UEs 701 and 702 perform PHR according to the PHR format configured based on the RRC message as denoted by reference number 710. The RRC message may include the information on at least one of PHR report cycle, PH, PHR report barring timer, and pathloss change size as well as the normal or extended PHR configuration information.

Referring to FIG. 7, each UE 701, 702 is in the dual connectivity mode to the MeNB 700 and the SeNB 703, 704 and thus needs to perform PHR to both the eNBs. The PHR may be performed in two ways: transmitting PH information of the respective cell groups separately and transmitting the PH information of the cell groups (PCG and SCG) integrally.

In the first method, each PH information includes the information about PCG or SCG and thus can be transmitted using the legacy PHR format. Also, since the PHR timer values received through the RRC message are set per cell group, it is possible to transmit the per-cell group PH information to the eNB of the corresponding cell group, i.e. MeNB or SeNB, at the time when the PHR is triggered by the corresponding timer.

In the second method, the PH information on all of the serving cells belonging to the PCG and SCG are transmitted integrally. In this case, it is necessary to introduce a new PHR format including the PH information on all of the serving cells or transmit the PHR MAC CE messages corresponding to respective cell groups redundantly. In the latter case, the UE has to transmit the PH information on all of the serving cells to which the UE is connected, currently to both the eNBs 700 and 703 (or 704) such that each eNB predicts the transmit power shortage of the UE quickly.

In the former case, the MeNB and SeNB exchange the PH information received from the UE to check the transmit power status of the UE. In this case, backhaul delay occurs between the two eNBs so as to retard predicting the transmit power shortage.

FIG. 8A is a diagram illustrating a PHR format for a dual connectivity-enabled UE to transmit the PH information for all serving cells to the MeNB and SeNB according to an embodiment of the present disclosure.

FIG. 8A shows a new PHR format which is capable of including the PH information of the two cell groups, i.e. PCG and SCG, for use in reporting the PH information on all serving cells of the PCG and SCG. The legacy extended PHR 502 of FIG. 5 includes the PH information corresponding to Type 2 and Type 1 of the PCell of the PCG in the second/third and fourth/fifth octets. In the dual connectivity environment, the pSCell (special SCell) having the uplink control channel in the SCG of the SeNB may have the PH information corresponding to type 2 and type 1 like the PCell. Accordingly, they may be arranged at the sixth/seventh and eighth/ninth octets as shown in FIG. 8A. For other SCells, the PH can be transmitted as in the legacy PHR format.

FIG. 8B is a diagram illustrating a PHR format for a dual connectivity-enabled UE to transmit the PH information for serving cells to the MeNB and SeNB according to an embodiment of the present disclosure.

Referring to FIG. 8A, the type 2 and type 1 PH information for the special SCell (pSCell) are included in different forms as in FIG. 8A.

In more detail, since the bitmap information of the first octet of the extended PHR indicates all of the secondary serving cells for the UE, the PHR format of FIG. 8B can be considered when the special SCell indicator is included in the bit map. In the extended PHR format, the PH information corresponding to the bitmap indicating the serving cell may be arranged in the PHR format, and the corresponding PH information are may be arranged in order according to the information on the position of the index of the special SCell in the bitmap.

In the legacy PHR format, if the PH information for the secondary serving cell is set to 1 in the bitmap and the type 1 PH information is carried at the corresponding position, both the type 2 and type 1 PH information may be included for the special SCell.

FIG. 8B shows a PHR format of the above embodiment of the present disclosure. If the index of the special SCell is 4 and its corresponding bit is set to 1 in the bitmap, the type 2 and type 1 PH information may be carried at the positions corresponding to the index.

In the case of using the legacy extended PHR format other than the PHR format, the type 2 PH is transmitted to the MeNB through the PCell and the SeNB through the pSCell. It is also possible to concatenate the PHR formats separated for the respective cell groups. In this case, the PHR format has the share of concatenated two legacy extended PHR formats. It also can be considered to use the legacy PHR format but including the type 2 PH is included for only one of the PCell and pSCell.

In an embodiment of the present disclosure, the UE may determine whether to include the type 2 PH depending on the serving cell/eNB to which the PHR is transmitted.

For example, if the PHR is transmitted to the MeNB (or transmitted through a PCG serving cell or triggered in association with a PCG serving cell), the PHR may include the type 2 PH for the PCell and type 2 PHs for the PCG and SCG serving cells in the activated state.

If the PHR is transmitted to the SeNB (or transmitted through an SCG serving cell or triggered in association with an SCG serving cell), the PHR may include the type 2 PH for the pSCell and the type 2 PHs for the PCG and SCG serving cells in the activated state.

Figure 9:
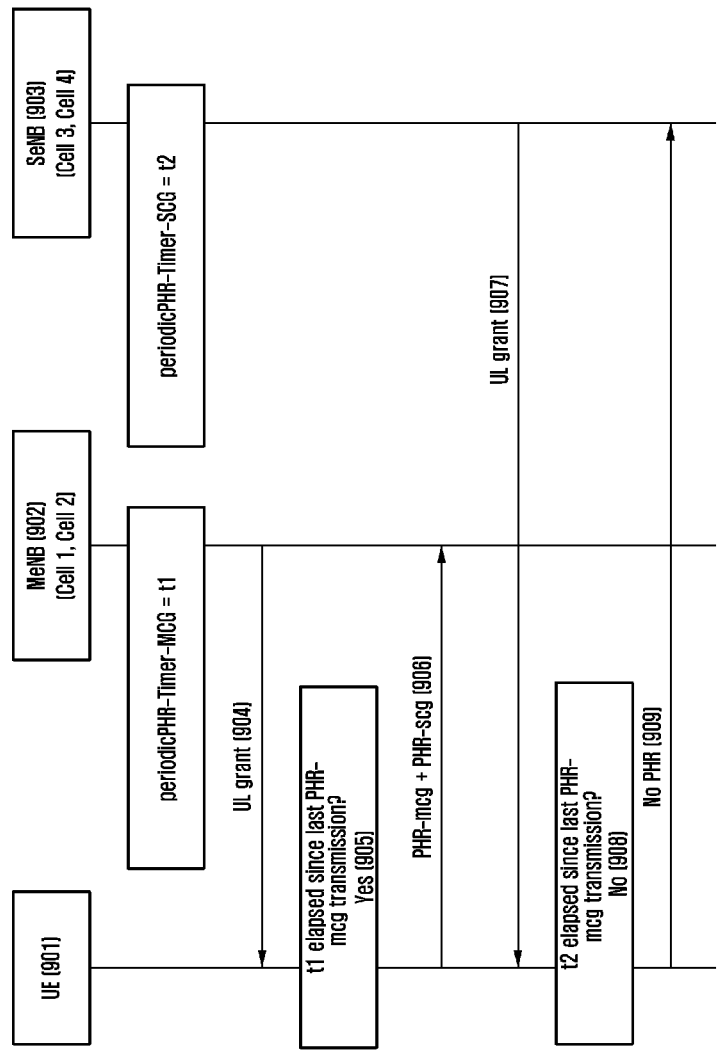
FIG. 9 is a signal flow diagram illustrating signal flows among the UE and eNBs in per-cell group PHR procedure according to an embodiment of the present disclosure.

FIG. 9 is a signal flow diagram illustrating signal flows among the UE and eNBs in per-cell group PHR procedure according to an embodiment of the present disclosure.

Referring to FIG. 9, a UE 901, an MeNB 902, and an SeNB 903 exchange signals.

In an embodiment of the present disclosure, the eNB 901 may configure the event (timer expiry, pathloss, etc.) triggering PHR of the UE 901. In the dual connectivity mode, the PHR configuration information for the MeNB 902 and SeNB 903 may be different from or identical with each other, and the UE 901 may operate differently depending on the per-cell group PHR event.

Table 1 shows the PHR triggering conditions.

TABLE 1

| Triggers | Note | Which one is suitable? Single or Double? |
|---|---|---|
| Pathloss change of activated serving cell | dl-PathlossChange configured per cell group. May be useful to report to both eNBs when path loss of a cell group changes more than the corresponding threshold | Double |
| Periodic timer expires | periodicPHR-Timer configured per cell group. It does not make sense to trigger PHR towards an eNB only because the timer expires for the other eNB | Single |
| (re)configuration of PHR functionalities | It is mainly to initialize the other triggers. May not need to be triggered towards the other ENB. | Single |
| Power-Management Maximum Power Reduction (P-MPR) change | P-MPR change would affect both ENBs. May be useful to report to both eNBs when P-MPR of a cell group changes more than the corresponding threshold | Double |

The 3GPP Technical Specification (TS) 36.321 specifies four PHR triggering conditions as shown in Table 1. The PHR is triggered, when the pathloss change is greater than a threshold designated by the eNB, when the periodic timer for PHR expires, when the PHR configuration changes, when the change of maximum power reduction value for power management is greater than a threshold value designated by the eNB.

FIG. 9 shows the message flows when the periodic timer expires among the four conditions. The periodicPHR-Timer values for the PCG and SCG are set to t1 and t2 independently as shown in the drawing.

If the MeNB 902 allocates uplink data channel resource to the UE 901 at operation 904 and then the timer t1 expires at operation 905, the UE 901 sends the MeNB 902 the PHR including the MCG PH information and SCG PH information at operation 906. At this time, the PH information may be transmitted in a new PHR format or the legacy PHR formats concatenated. The PHs may be transmitted with one MAC CE value in the concatenated PHR format or with independent MAC CEs in the respective PHR formats.

In an embodiment of the present disclosure, the uplink data channel resource is allocated by the SeNB 903 at operation 907, but the timer t2 is not expired yet at operation 908, and thus the UE 901 transmits no PHR at operation 909.

In an embodiment of the present disclosure, the reason for transmitting the PHR including the integrated PH information on the cell groups to the MeNB or SeNB is because two eNBs have independent uplink radio resource scheduling rights and thus each eNB cannot become aware of the transmit power shortage of the UE.

In the case of the intra-eNB carrier aggregation, the UE connects to a plurality of serving cells of one eNB such that the eNB can acquire the information on the UE's uplink transmit powers required in the respective serving cells. In the dual connectivity, however, the MeNB and SeNB operate independently and cannot exchange control information in real time because there are connected through a non-ideal backhaul. The UE transmits the transmit power margins for the cell groups of the respective eNBs integrally and the eNBs analogize the power consumption types of the others and UE's power margin, thereby preventing each eNB from allocating excessive uplink radio resource to the UE and thus wasting resource and preventing the UE from underdoing transmit power shortage.

By way of precaution against power shortage of the UE, it is necessary to allocate radio resource efficiently. Although the uplink radio resource allocation information is necessary to calculate the power consumption per bandwidth, the current PHR format has no space for including the corresponding information. Instead, the virtual (V) field of FIG. 5 makes it possible to analogize the power utilization and pathloss change of the current UE with the PH value for a specific reference bandwidth. Accordingly, in the dual connectivity, the UE determines whether to set the PH value for all the serving cells to the PH value for the radio resource allocated in the real serving cell or the PH value for the virtual cell.

In an embodiment of FIG. 9, the PHR triggered by the fulfillment of the condition configured in the corresponding cell group includes the PH values on the radio resource actually allocated in the corresponding serving cell and the PHR for other cell group includes the virtual PH value. If the periodic PHR timer configured for the MCG expires at operation 905, the PH information transmitted to the MCG is the PH information corresponding to the actually allocated band, and the PH information transmitted to the SCG is virtual PH information. In this case, the eNB can estimate the pathloss of the UE in association with the counterparty eNB and the resource-to-power efficiency.

In an embodiment of the present disclosure, the PH information transmitted to both the eNBs can be the PH information on the radio resource allocated actually. In this case, the MeNB cannot analogize the pathloss based on the PH information for the real SCG but can detect the power shortage occurring at the UE.

In an embodiment of the present disclosure, when the UE 901 transmits the PH value for the MCG and SCG at operation 905, there may be no PH value for the SCG. If no uplink resource for the SCG is allocated in the subframe corresponding to the allocated uplink radio resource, the virtual PH information is included. Accordingly, if both the PH information are related to the uplink resources allocated actually, the PH information for the recently allocated resource. Assuming that the MeNB 902 does not allocate further uplink resource since operation 904 when the SeNB 903 allocates uplink resource at operation 907 and the UE 901 attempts to transmit PHR therefor, the PHR may include the PH information for the resource allocated at operation 904.

In the embodiment of FIG. 9, the PHR may be performed with other combinations according to Table 2. In the case of the second combination of Table 2, the UE 901 transmits PHR when receiving an Uplink (UL) grant from at least one of the MeNB 902 and SeNB 903, when double triggering is applied, or when one of the two timers expires. In more detail, the UE 901 may transmit a PHR-mcg and PHR-SCG to the eNB which has transmitted the UL grant.

Figure 10:
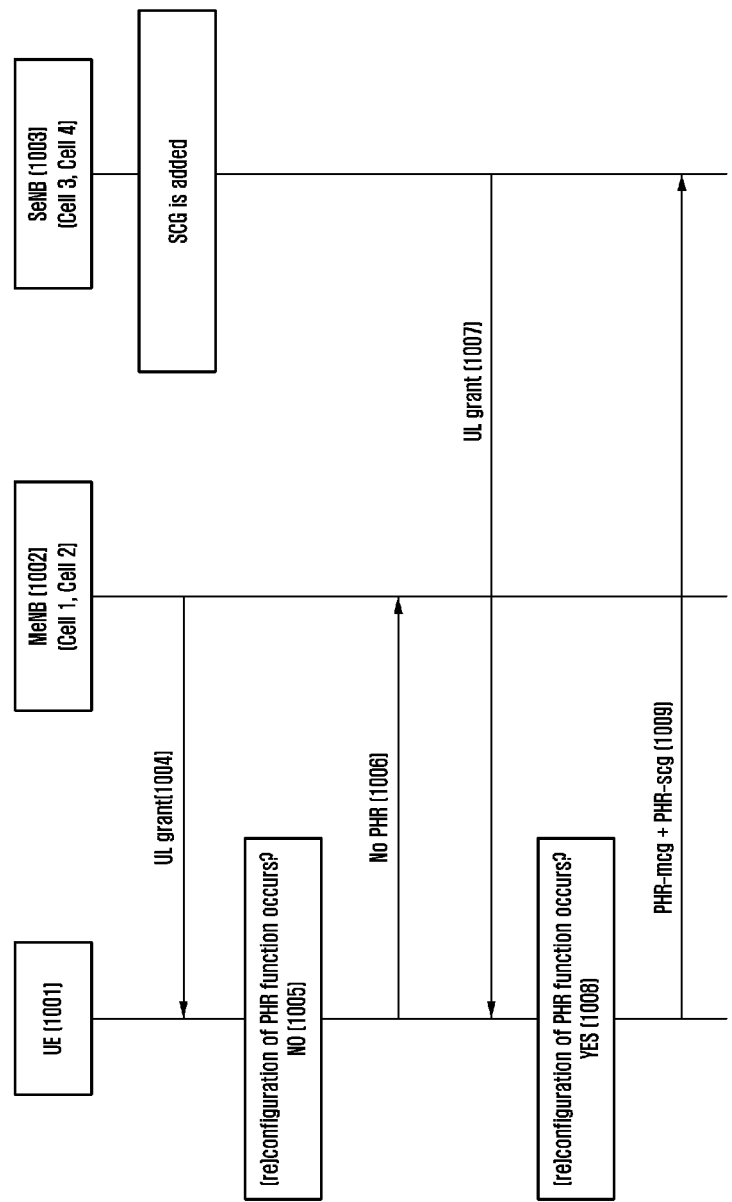
FIG. 10 is a message flow diagram illustrating message flows among a UE, an MeNB, and an SeNB in a PHR procedure of the UE in the dual connectivity mode according to an embodiment of the present disclosure.

FIG. 10 is an example message flow diagram illustrating message flows among a UE, an MeNB, and an SeNB in a PHR procedure of the UE in the dual connectivity mode according to an embodiment of the present disclosure.

FIG. 10 shows the signal exchanges among a UE 1001, an MeNB 1002, and an SeNB 1003.

The UE 1001 receives a UL grant from the MeNB 1002 at operation 1004.

The UE 1001 determines whether the PHR configuration is changed based on the UL grant at operation 1005.

If the PHR configuration is not changed, the UE skips transmitting PHR at operation 1006.

The UE 1001 receives a UL grant from the SeNB 1003 at operation 1007.

The UE 1001 determines whether the PHR configuration for the SCG is changed based on the UL grant at operation 1008.

If the PHR configuration for the SCG is changed, the UE 1001 transmits the PHR integrating the PH information for the MCG and SCG to the SeNB 1003 at operation 1009.

The UE operation in FIG. 10 is identical with that of FIG. 9 in that the timer expiry and PHR configuration change triggers PHR to the corresponding cell group.

Table 2 shows the PHR schemes according to the PHR triggering conditions in the dual connectivity.

TABLE 2

| | Path loss trigger | Periodic trigger | (re)configuration trigger | P-MPR trigger |
|---|---|---|---|---|
| combination 1 | Double triggering | Single triggering | Single triggering | Double triggering |
| combination 2 | Double triggering | Double triggering | Double triggering | Double triggering |
| combination 3 | Single triggering | Single triggering | Single triggering | Single triggering |

Table 2 shows three PHR schemes available in the dual connectivity mode according to an embodiment of the present disclosure.

Double triggering is a PHR scheme in which the UE transmits the PH information for all cell groups to both the eNBs when at least one of the four PHR triggering conditions per cell group is fulfilled. Single triggering is a PHR scheme in which the UE transmits the PH information for all of the cell groups to only the corresponding eNB when the PHR triggering for a specific cell group occurs.

FIGS. 9 and 10 are signal flow diagrams illustrating the signal-triggering PHR procedure.

In the first PHR method, if the PHR is triggered by the pathloss change or P-MPR change, the double triggering scheme is applied to transmit the PHR to both the MeNB and SeNB, otherwise, by the PHR timer expiry and PHR reconfiguration, the single triggering scheme is applied.

In the second PHR method, the double triggering scheme is applied when at least one of the PHR triggering conditions is fulfilled independently of the cell group.

In the third PHR method, the single triggering scheme is applied when at least one of the PHR triggering conditions is fulfilled per each cell group.

In the embodiment of FIG. 10, the PHR method may be executed with different combinations according to Table 2. For example, when the UL grant is received from at least one of the MeNB 1002 and SeNB 1003, if at least one PHR is (re)configured, it is possible to transmit PHR. In more detail, the UE transmits the PHR-mcb and PHR-scg to the eNB which has transmitted the UL grant.

Figure 11A:
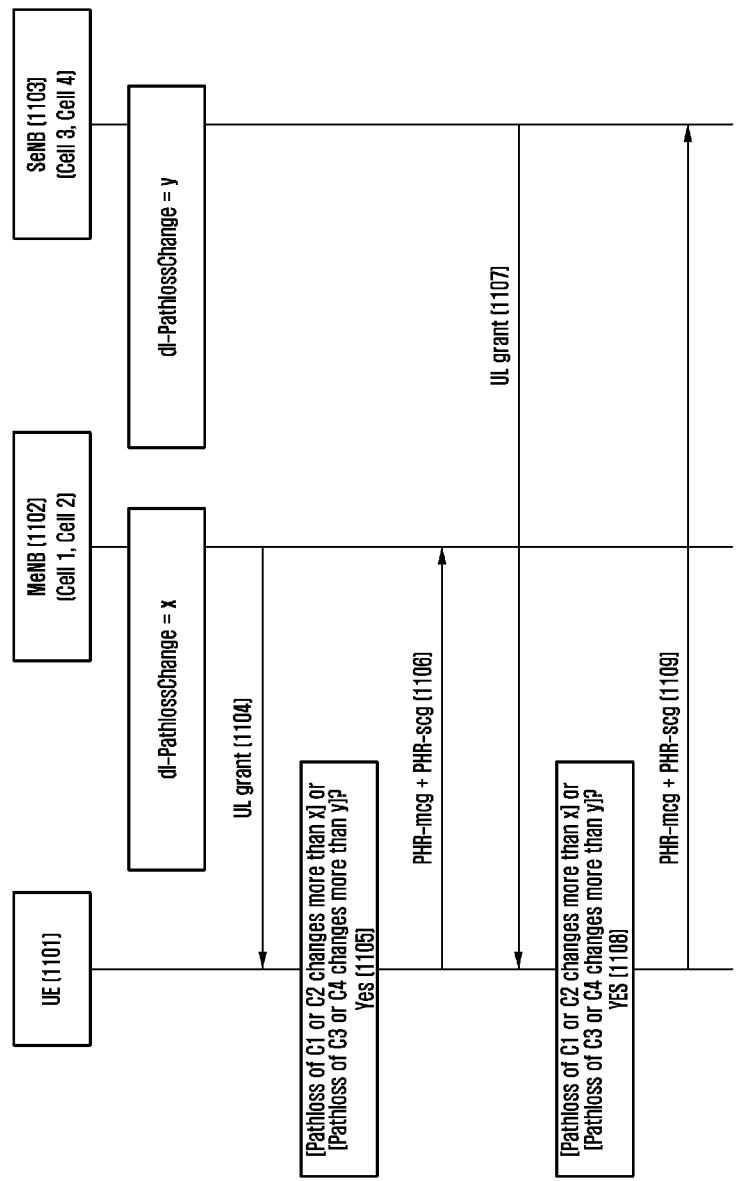
FIGS. 11A and 11B are signal flow diagrams illustrating signal flows among a UE and eNBs in the double triggering scheme based on pathloss change and Power-Management Maximum Power Reduction (P-MPR) change triggering PHR in the dual connectivity according to various embodiments of the present disclosure.
Figure 11B:
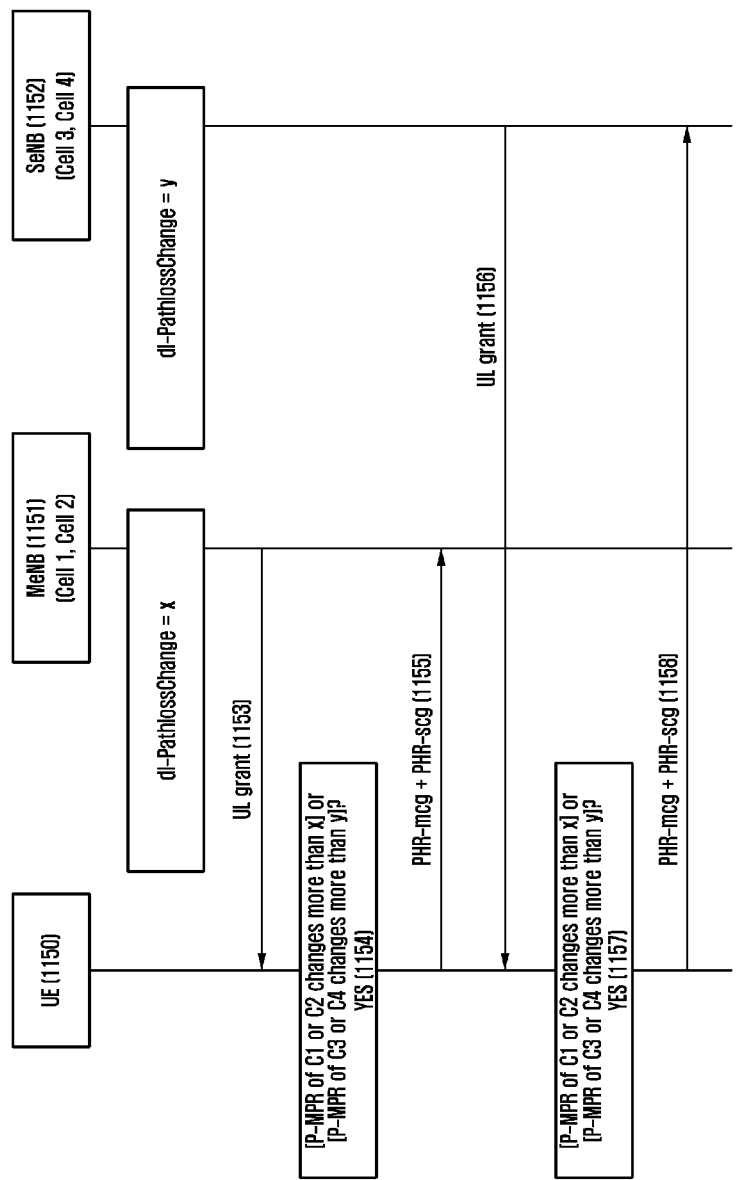

FIGS. 11A and 11B are signal flow diagrams illustrating signal flows among a UE and eNBs in the double triggering scheme based on pathloss change and P-MPR change triggering PHR in the dual connectivity according to various embodiments of the present disclosure.

FIGS. 11A and 11B show the signal flows among a UE 1101 at operation 1150, an MeNB 1102 at operation 1151, and an SeNB 1103 at operation 1152.

Unlike the signal triggering scheme illustrated in FIGS. 9 and 10, the doubling triggering scheme is applied when the pathloss change and P-MPR change condition is fulfilled in the first PHR method (combination 1) in Table 2 because these events are important for the two eNBs to check the UL transmit power of the UE.

Referring to FIGS. 11A and 11B, the pathloss change condition is configured with the threshold values notifying the eNB using an RRC message, and the threshold values x and y may be set to the same or different values for the cell groups.

Referring to FIG. 11A, the MeNB 1102 allocates uplink radio resource to the UE 1101 at operation 1104.

The UE 1101 determines whether the pathloss changes for the respective cell groups are greater than the threshold values x and y at operation 1105.

If so, the UE 1101 sends the PH information for MCG and SCG to the MeNB 1102 at operation 1106.

The SeNB 1103 allocates uplink resource to the UE 1101 at operation 1107.

The UE 1101 determines whether the pathloss changes in the cell groups are greater than the per-cell group threshold values x and y at operation 1108.

If so, the UE 1101 sends the SeNB 1103 the PH information for the MCG and SCG at operation 1109.

If the pathloss change is greater than the threshold value in the corresponding cell group, the UE 1101 transmits PHR. If the uplink radio resource is allocated for initial transmission in the serving cell x, the UE 1101 checks the following two conditions and, if at least one of the two conditions is fulfilled, this triggers PHR and thus the UE 1101 transmits PHR using the uplink radio resource.

[Condition 1]

If there is any serving cell of which pathloss change is greater than a threshold value, which is configured for the cell group (or MAC entity) to which the serving cell x belongs, among the serving cells in the activated state currently and belonging to the cell group including the serving cell x, this condition is fulfilled.

[Condition 2]

If there is any serving cell of which pathloss change is greater than another threshold value, which is configured for a cell group (or MAC entity) to which no serving cell x belongs, among the serving cells in the activated state and belonging to the cell group excluding the serving cell x, this condition is fulfilled.

FIG. 11B is the message flow diagram illustrating the double triggering procedure based on the P-MPR change.

Similar to the PHR triggered by the pathloss change, if the P-MPR change is greater than a threshold value per cell group, the UE 1150 transmits the PH information for all serving cells of the MCG and SCG on the allocated uplink radio resource.

The UE 1150 receives a UL grant from the MeNB 1151 at operation 1153.

The UE 1150 determines whether the P-MPR changes are greater than the threshold values x and y for the respective cell groups at operation 1154.

If so, the UE 1150 transmits the PH information for the MCG and SCG to the MeNB 1151 at operation 1155.

The UE 1150 receives a UL grant from the SeNB 1152 at operation 1156.

The UE 1150 determines whether the P-MPR changes are greater than the threshold values x and Y for the respective cell groups at operation 1157.

If so, the UE 1150 transmits the PH information for the MCG and SCG to the SeNB 1152 at operation 1158.

When checking the triggering condition at operations 1154 and 1157, the threshold value is set for cell C1 or C2 of the MeNB 1151 and the threshold value is set for cell C3 and C4 of the SeNB 1152, if the P-MPR change is greater than the threshold x or Y, the UE 1150 transmits the PH information for the MCG and SCG to the eNB which has allocated uplink resource. If the triggering condition for the MCG is not fulfilled at operations 1108, shown in FIG. 11A, and 1157, the UE does not transmit PHR to the SeNB. In the case that the PHR is triggered for the MCG, although the triggering condition for the MCG is not fulfilled at operations 1108 and 1157, the UE may transmit PHR to the SeNB. In this embodiment of the present disclosure, it is assumed that the PHR triggering condition for SCG is not fulfilled. That is, whether to make the double triggering to compel to transmit the PHR report to both the eNBs at the time when the PHR triggering occurs, or reconsider the triggering condition at the time when the UL grant occurs, depends on the implementation.

The PHR methods according to the embodiments of FIGS. 11A and 11B may be performed with other combinations. For example, in the case of the single triggering scheme, if the UL grant is received from at least one of the MeNB 1102 and SeNB 1103, the UE transmits PHR to the corresponding eNB only when the pathloss change or P-MPR change for the corresponding cell group is greater than a predetermined threshold value. In more detail, the UE 1101 transmits the PHR-mcg and PHR-scg to the eNB which has transmitted the UL grant.

Figure 12A:
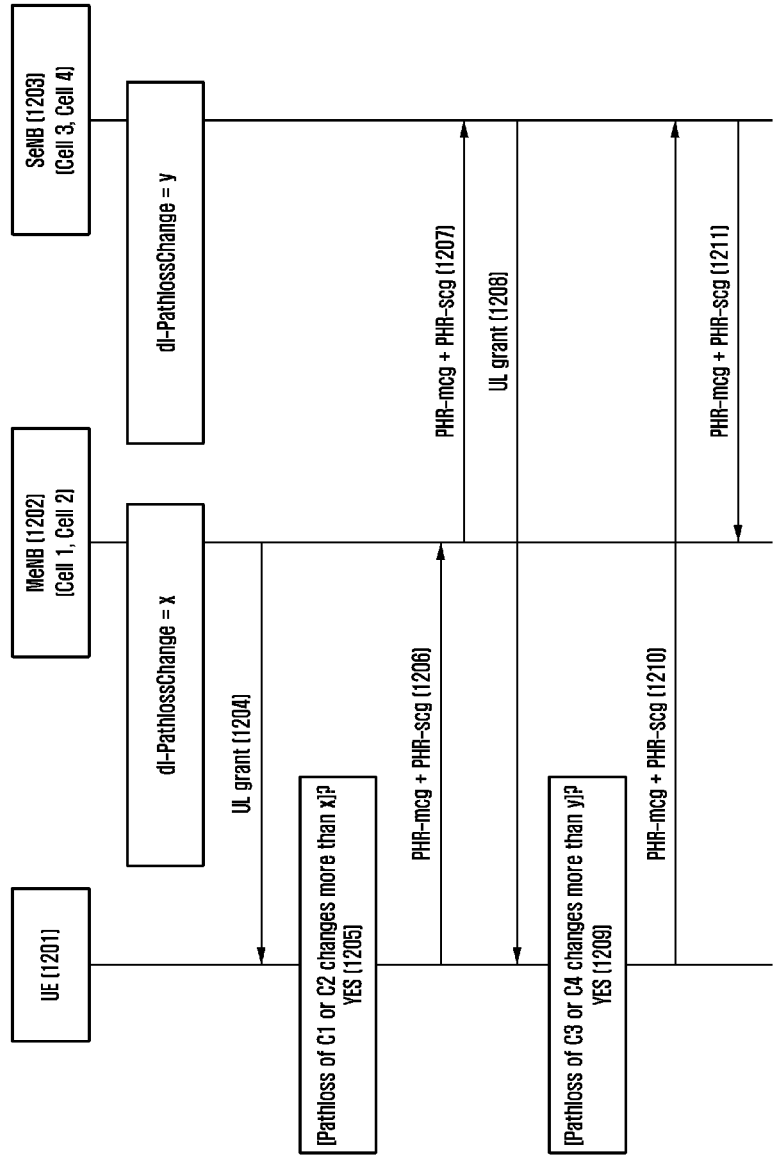
FIGS. 12A and 12B are signal flow diagrams illustrating a procedure of transmitting the PH information through backhaul in the single triggering scheme based on the pathloss and P-MPR in the dual connectivity according to various embodiments of the present disclosure.
Figure 12B:
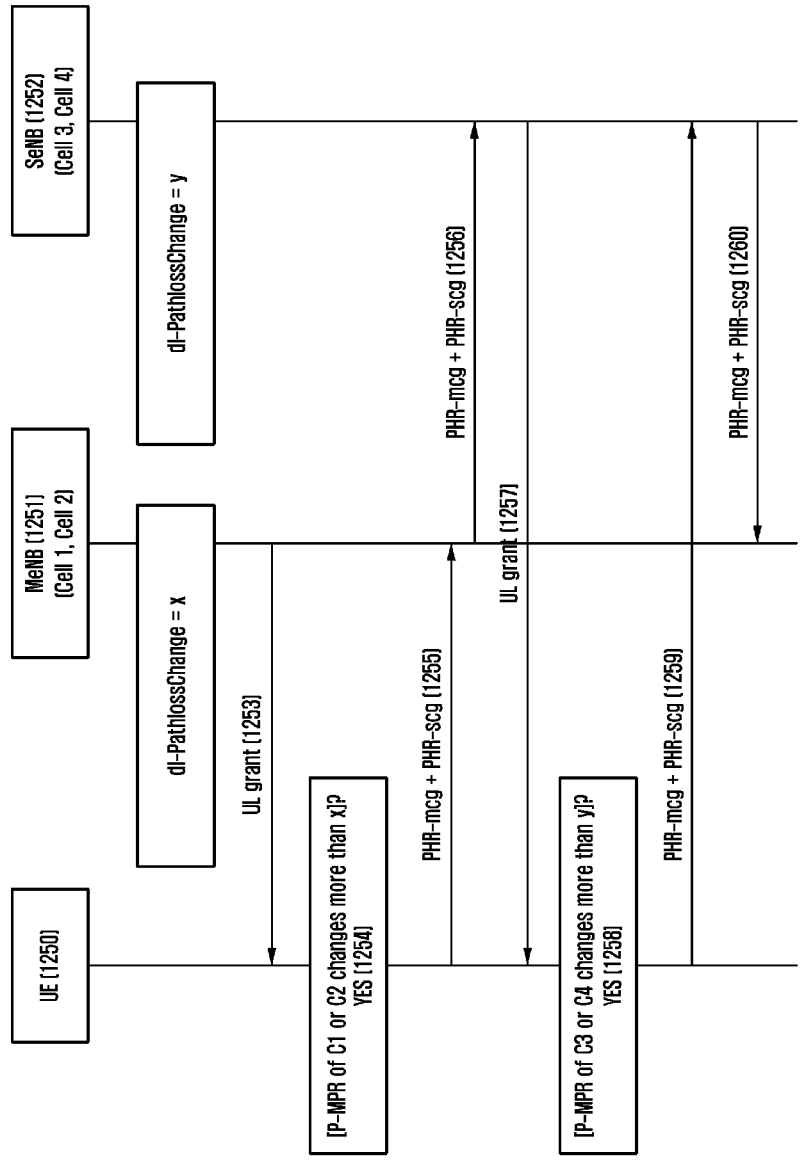

FIGS. 12A and 12B are example signal flow diagrams illustrating a procedure of transmitting the PH information through backhaul in the single triggering scheme based on the pathloss and P-MPR in the dual connectivity according to various embodiments of the present disclosure.

FIGS. 12A and 12B illustrate the signal among a UE 1201 (1250), an MeNB 1202 (1251), and an SeNB 1203 (1252), respectively.

In the case of the single triggering scheme for transmitting PHR only by the triggering condition configured per the cell group, since the MeNB and SeNB have no PH information of the UE as shown in FIGS. 11A and 11B, there is no room for allocating excessive uplink radio resource.

In this case, since resource loss may occur or the UE may perform inefficient transmission operation, it is necessary to share the PH information for other cell groups through the backhaul. Unlike the procedure of FIGS. 11A and 11B in which the PHR is transmitted to both the eNBs when the pathloss change or P-MPR change is greater than a predetermined threshold configured per cell group, the UE transmits the PHR to only the eNB in which the PHR is triggered when the pathloss change or P-MPR change is greater than the threshold configured per cell group in the procedure illustrated in FIGS. 12A and 12B.

Referring to FIG. 12A, the MeNB 1202 allocates uplink radio resource to the UE 1201 at operation 1204.

The UE 1201 determines whether the pathloss changes of the serving cells C1 and C2 of the MeNB 1202 are greater than the threshold value x configured to the corresponding cell group at operation 1205.

If so, the UE 1201 transmits the PHR to the MeNB 1202 at operation 1206. Although the pathloss changes of the MCG serving cells C1 and C2 are less than the threshold x and the pathloss changes of the SCG cell C3 or C4 is greater than the threshold value y, the UE 1201 may transmit PHR. This is the difference from the double triggering scheme described with reference to FIGS. 11A and 11B.

The MeNB 1202 forwards the PHR information for all of the serving cells to the SeNB 1203 through an X2 or Xn interface (backhaul) at operation 1207. Accordingly, the SeNB 1203 can acquire the information on the transmit power margin of the current UE 1201. In order to analogize the information on the transmit power efficiency and pathloss of the UE 1201, the UL radio resource allocation information corresponding to the PH information is required. This is because the uplink transmit power varies according to the allocated uplink radio resource and thus it is difficult to analogize the pathloss information without the corresponding information. Accordingly, the MeNB 1202 may send the SeNB 1203 the UL radio resource allocation information for PHR too. In an embodiment of the present disclosure, the MeNB 1202 may also transmit the PH information for SCG along with the UL radio resource allocation information or not.

The SeNB 1203 allocates uplink radio resource to the UE 1201 at operation 1208.

The UE 1201 determines whether the pathloss changes in C3 and C4 of the SeNB 1203 is greater than the threshold y at operation 1209.

If the pathloss change in C3 and C4 is greater than the threshold value, the UE 1201 transmits the PH information for the MCG and SCG to the SeNB 1203 at operation 1210.

The SeNB 1203 forwards the PH information received as above to the MeNB 1202, if necessary, with the exception of the SCG PHR information at operation 1211.

As described above, when transmitting the PH information through the backhaul, the PH information may include the information on the radio resource allocated to the SeNB.

FIG. 12B shows the signal flows among the UE 1250 and eNBs 1251 and 1252 when the P-MPR change is greater than the threshold value. In this case, the UE 1250 checks the P-MPR condition is fulfilled by comparing with only the threshold value configured for the corresponding cell to transmit PHR like the PHR single triggering procedure based on the pathless.

The MeNB 1251 allocates UL resource to the UE 1250 at operation 1253.

The UE 1250 determines whether the P-MPR change is greater than the threshold value x configured for the MCG cell group (C1 and C2) at operation 1254.

If the P-MPR change is greater than the threshold value, the UE 1250 transmits the PH information for the MCG and SCG to the MeNB 1251 at operation 1255.

The MeNB 1251 transmits to the SeNB 1252 the received PHR or only the part for MCG included in the received PHR through the X2 or Xn interface at operation 1256. At this time, the UL radio resource allocation information for PHR may be included also as in the procedure of sharing PHR between eNBs according to the pathloss change.

The SeNB 1252 allocates uplink radio resource to the UE 1250 at operation 1257.

The UE 1250 determines whether the P-MPR change for the SCG cell is greater than the threshold value at operation 1258.

If the P-MPR change is greater than the threshold, the UE 1250 reports the PH information for all of the cell groups to the SeNB 1252 at operation 1259.

The SeNB 1252 shares the corresponding PH information with the MeNB 1251 through X2 or Xn interface at operation 1260.

Figure 13:
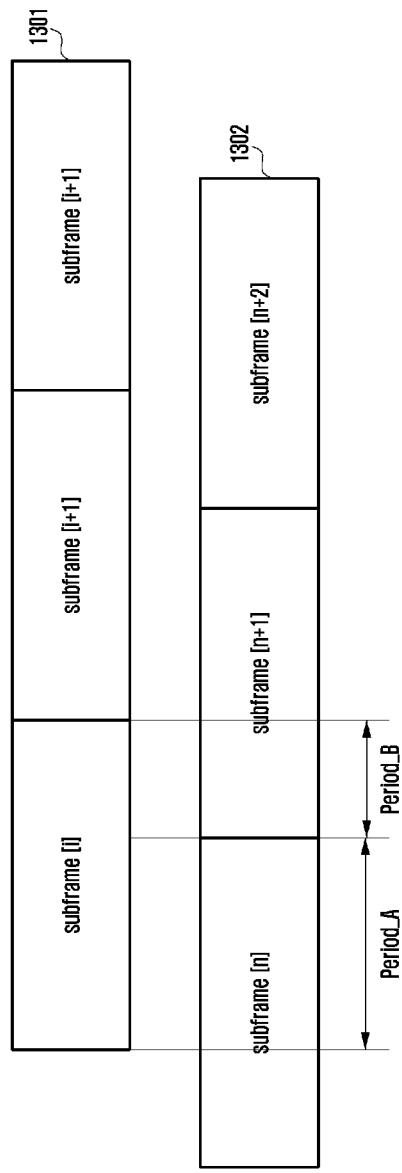
FIG. 13 is a diagram illustrating a mechanism of compensating for the timing mismatch when transmitting the PH information for different cell groups in the dual connectivity mode according to an embodiment of the present disclosure.

FIG. 13 is a diagram illustrating a mechanism of compensating for the timing mismatch when transmitting the PH information for different cell groups in the dual connectivity mode according to an embodiment of the present disclosure.

Referring to FIG. 13, reference number 1301 denotes the time frame of the MCG, and reference number 1302 denotes the time frame of the SCG. Since the LTE system does not guarantee synchronization between eNBs, the timing difference may range from 0.5 msec to 1 msec (one subframe).

In this embodiment of the present disclosure, the subframe of the MCG is a little late as compared to the subframe of the SCG. If the MeNB allocates uplink resource in the subframe i and PHR is triggered in the corresponding subframe at the UE, the UE has to transmit the PH information for the SCG too.

In this case, if there is the uplink radio resource allocated by the SeNB in the subframes n and n+1 as denoted by reference number 1302, the UE may determine the subframe for transmitting the PHR information.

In the case that two SCG subframes n and n+1 are overlapped with the MCG subframe i as shown in FIG. 13. Assuming the duration overlapped with the subframe n is period A and the duration overlapped with the subframe n+1 is period B, the period A is longer than the period B. In this case, the subframe n+1 is referred to as a minor subframe, and the subframe n is referred to as a major subframe. If a PHR for a specific cell group is triggered, the PHR information for other cell group is associated with the major subframe such that the PH information may be included in the corresponding subframe. In an embodiment of the present disclosure, if the overlapped duration between the subframe n and the subframe i and the overlapped duration between the subframe n+1 and subframe i are identical with each other, the UE may transmit the PH information in one of the subframes n and n+1 to the eNB selectively. The selection can be made according to a predetermined method shared between the UE and the eNB.

If the PHR is transmitted at the subframe I of a cell group, the UE generates the PHR including the PHs of the serving cells in the activated state currently and transmits the PHR at a subframe. At this time, the UE determines the subframe at which the PH is calculated based on the subframe number for the serving cells belonging to the cell group including the serving cell through which the PHR is transmitted and the subframe at which the PH is calculated based on the amount of overlapping with the subframe carrying the PHR for the serving cells belonging to the serving cell which is different from the serving cell through which the PHR is transmitted.

For example, if the PHR is transmitted in the subframe i of the PCell, the UE calculates the PH at the subframe (i.e. subframe i of the corresponding serving cell) having the same subframe number as the PH for the PCG serving cells and the PH at the subframe overlapped more with the subframe carrying the PHR among the subframes of the respective serving cells as the PH for SCG serving cells, the PHs being included in the PHR.

The PH calculation may be performed according to the method as specified in section 5.1.1.2 of 3GPP TS36.213.

Figure 14:
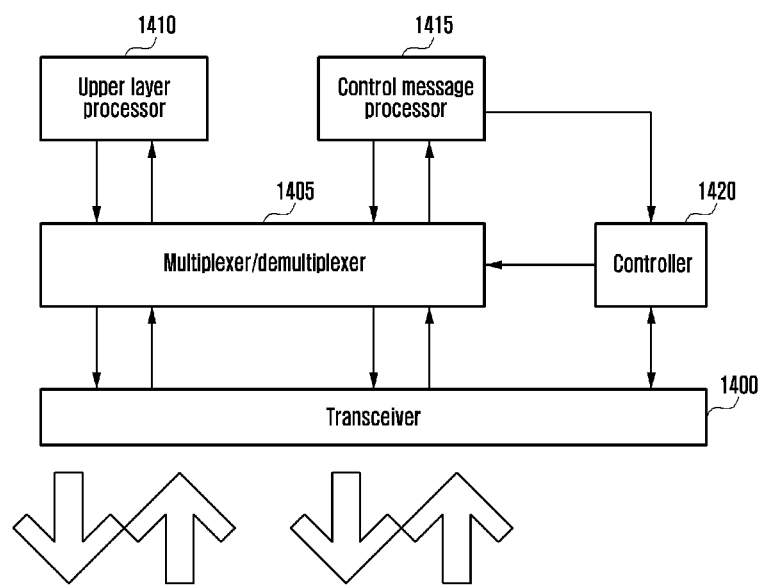
FIG. 14 is a block diagram illustrating a configuration of the UE according to an embodiment of the present disclosure.

FIG. 14 is an example block diagram illustrating a configuration of the UE according to an embodiment of the present disclosure.

Referring to FIG. 14, the UE according to an embodiment of the present disclosure includes a transceiver 1400, a multiplexer/demultiplexer 1405, upper layer processor 1410 and 1415, and a controller 1420. In the case of transmitting control signals and/or data to the eNB, the UE multiplexes the controls signals and/or data by means of the multiplexer/demultiplexer 1405 and transmits the multiplexed signal by means of the transceiver 1405 under the control of the controller 1420. In an embodiment of the present disclosure, the downlink control message related to uplink resource allocation is transmitted to the control message processor 1415, and the PH information generated in correspondence to the uplink resource allocation is included in the PHR.

Figure 15:
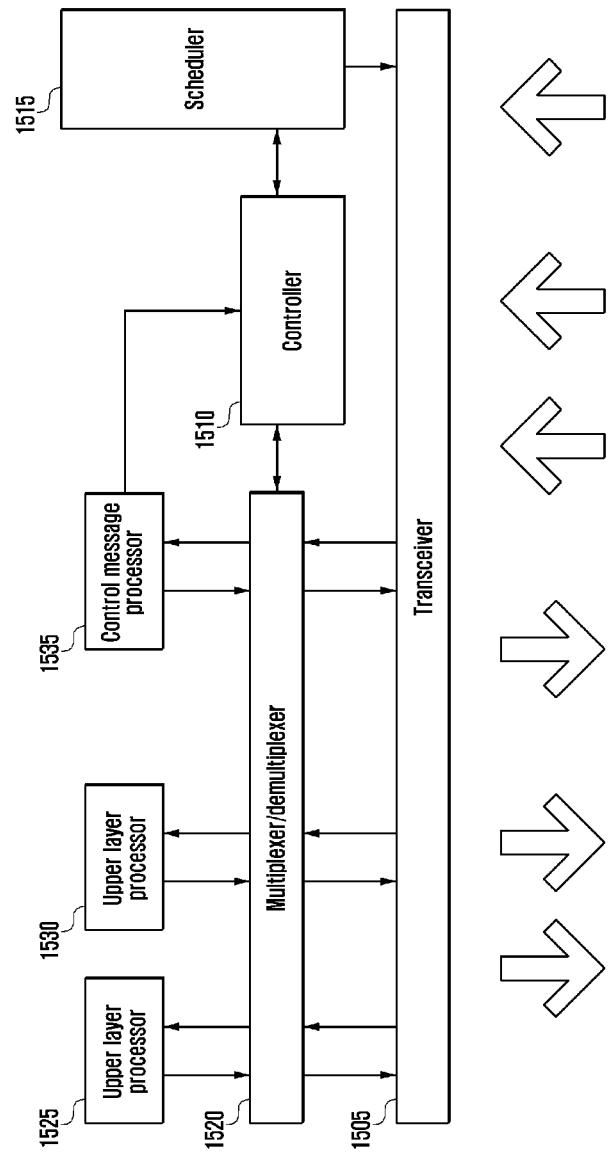
FIG. 15 is a block diagram illustrating a configuration of the eNB according to an embodiment of the present disclosure.

FIG. 15 is an example block diagram illustrating a configuration of the eNB according to an embodiment of the present disclosure.

Referring to FIG. 15, the eNB includes a transceiver 1505, a controller 1510, a multiplexer/demultiplexer 1520, a control message processor 1535, higher layer processors 1525 and 1530, and a scheduler 1515.

The transceiver 1505 is responsible for transmitting data and predetermined control signal through a downlink channel and receiving data and predetermined control signals through an uplink channel. In the case that a plurality of carriers is configured, the transceiver 1505 transmits and receives data and control signals through the plural carriers.

The multiplexer/demultiplexer 1520 is responsible for multiplexing data generated by the upper layer processors 1525 and 1530 and the control message processor 1535 or demultiplexing data received by the transceiver 1505 to deliver the demultiplexed data to the upper layer processors 1525 and 1530, the control message processor 1535, and the controller 1510. The controller 1510 determines whether to apply the dynamic normal PHR or extended PHR and whether to apply single or double triggering configuration to the UE and whether to include the configuration information in the RRCConnectionReconfiguration message.

The control message processor 1535 generates an RRC-ConnectionReconfiguration message to the lower layer, the message being transmitted to the UE, under the control of the controller 1510.

The upper layer processor 1525 (or 1530) established per service, processes the data generated in the user service such as File Transfer Protocol (FTP) and VoIP and delivers the processed data to the multiplexer/demultiplexer 1520 or processes the data from the multiplexer/demultiplexer 1520 and delivers the processed data to the upper layer serving application.

The scheduler 1515 allocates transmission resource to the UE at an appropriate timing in consideration of the buffer state and channel condition of the UE and processes the signal transmitted by the UE or to be transmitted to the UE by means of the transceiver 1505.

Figure 16A:
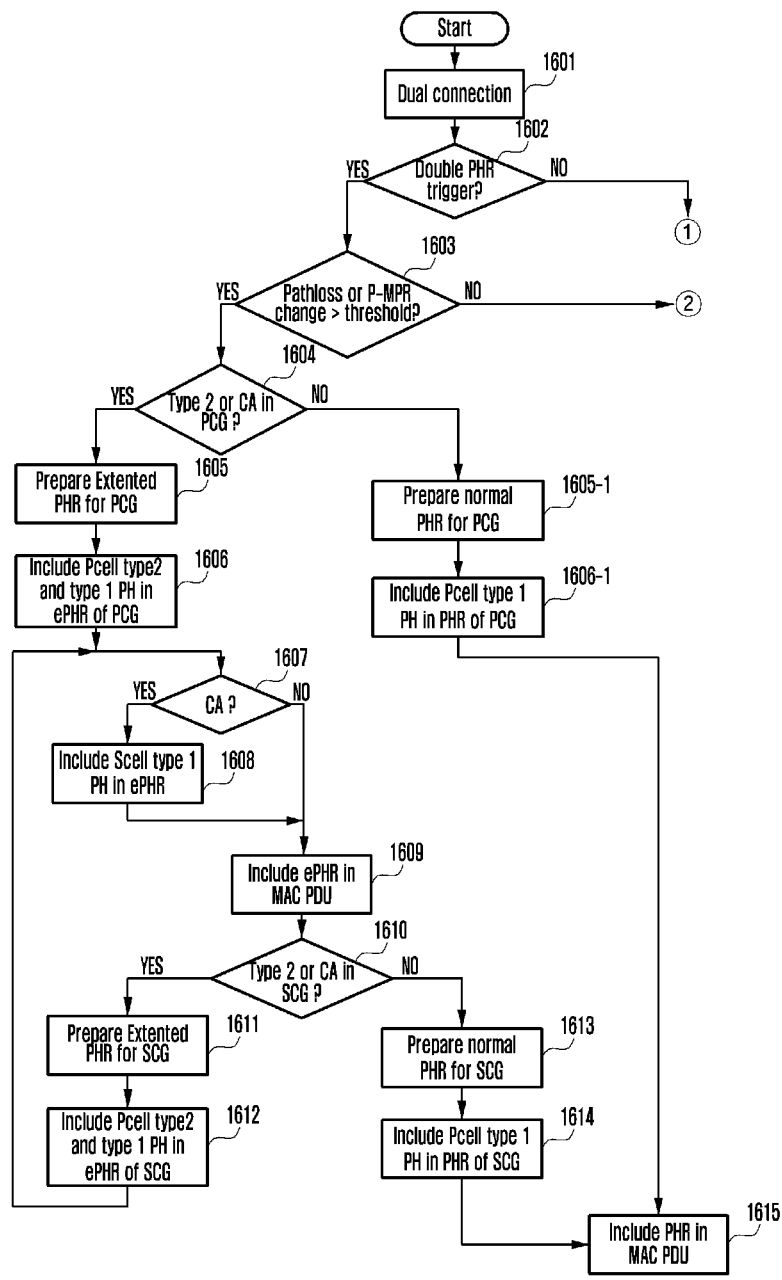

FIGS. 16A and 16B are example flowcharts illustrating the operation procedure of the UE with the triggering condition in the double triggering scheme according to various embodiments of the present disclosure.

FIGS. 16A and 16B are directed to the UE operation in association with the combination 1 in Table 2 and includes the operation when the pathloss change and P-MPR change are greater than the respective threshold values.

In an embodiment of the present disclosure, the UE operates in the dual connectivity mode at operation 1601.

The operations corresponding to combinations 2 and 3 are performed in the same order according to the operation corresponding to operation 1603. The UE operation may be determined depending on whether the UE follows the double triggering scheme or the single triggering scheme at operation 1602.

If the UE follows the single triggering scheme, it determines whether the PHR is triggered for the PCG or SCG at operation 1616, illustrated in FIG. 16B, and, if triggered for the PCG, determines whether to perform the extended PHR or normal PHR depending on whether the PHR for the corresponding cell group requires type 2 (simultaneous transmission of UL data and control channel) or PHR for other SCell is required at operation 1617.

If the extended PHR is configured at operation 1618, the UE includes the type 2 PH values in the PHR format at operation 1619 and, if the PCG is participating in the carrier aggregation at operation 1620, inserts the PH information for other SCell at operation 1621. Next, the UE transmits an MAC PDU including an extended PHR (ePHR) at operation 1622.

If the extended PHR is not required due to the type 2 PH information for PHR or carrier aggregation at operation 1617, the UE includes the PH information of the PCell of the PCG in the normal PHR format at operation 1623 and transmits the PHR using the MAC CE at operation 1624. The UE includes the corresponding PHR as MAC cell in the MAC PDU and attempts MAC frame transmission.

Operation 1625 is the case where the PHR is triggered in the SCG, and the UE operation is similar to that in the case whether the PHR is triggered in the PCG.

The UE determines whether the type 2 PH reporting or carrier aggregation is performed in the SCG at operation 1625. For the simultaneous transmission of the UL data and control channel in the pSCell (special SCell) of the SCG, it is necessary to report the type 2 PH or, in the situation where the other SCells with the exception of the pSCell of the SCG exist and carrier aggregation is activated in the corresponding cell, the extended PHR format is required as in the PCG at operation 1626, and the type 2 PH and type 1 PH for the PCell can be included at operation 1627.

The UE determines whether the corresponding SCG participates in the carrier aggregation at operation 1628 and, if the SCG participates in the carrier aggregation, the UE includes the type 1 PH for other SCells in the PHR at operation 1630 and, includes the corresponding MAC CE in the MAC PDU for transmission at operation 1629.

The UE prepares normal PHR for SCG at operation 1631. The UE includes the type 1 PH for the PCell in the PHR for the SCG at operation 1632 and includes the PHR in the MAC PDU for transmission at operation 1633.

If it is necessary to perform the double triggering in the combination 1 of table 2, the UE determines whether the ePHR is required for PCG at operation 1604, illustrated in FIG. 16A.

If the ePHR is required for the PCG, the UE prepares for ePHR for the PCG at operation 1605. The UE calculates the type 2 and type 1 PHs for the PCell and includes the PHs in the ePHR format at operation 1606 and determines whether the PCG participates in the carrier aggregation at operation 1607.

If the PCG participates in the carrier aggregation, the UE includes the PH information for other SCells in the PHR at operation 1608. The UE includes the PHR format in the MAC PDU in the form of an MAC CE at operation 1609.

The UE generates the PHR for the SCG at operation 1610. This operation is performed in the same as the PHR for SCG in the single triggering scheme as described above. The UE performs the PCG and SCG PHRs independently with the respective PHR formats, and the MAC PDU may includes other MAC CEs.

In the case of using the new PHR format proposed in the embodiments of FIGS. 8A and 8B, the UE may include the PH information for all of the serving cells in the new PHR format for the PCG and SCG.

The UE is capable of performing the operations described with reference to FIGS. 9 to 12, and those operations can be performed in the procedure of FIGS. 16A and 16B.

Figure 17A:
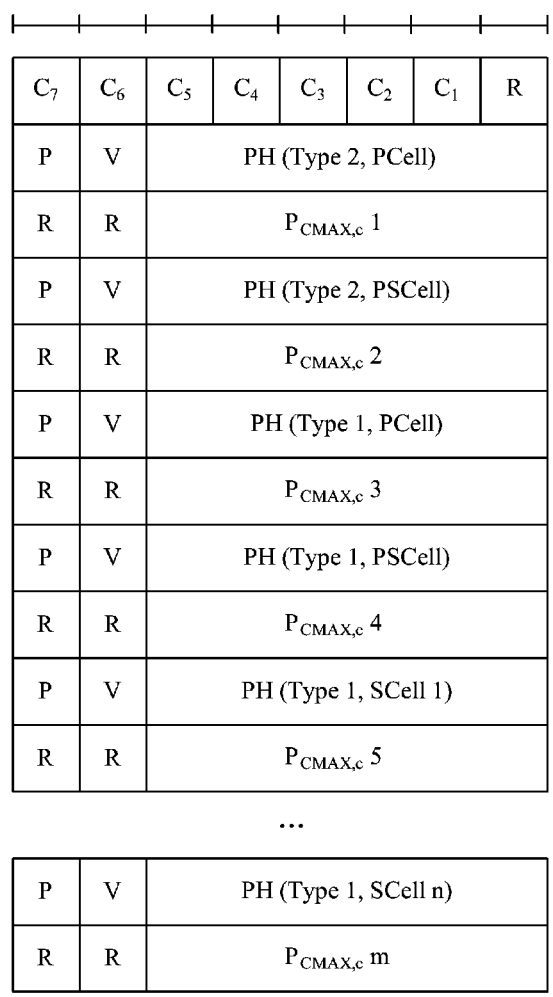

FIGS. 17A, 17B, and 17C are diagrams illustrating PHR formats transmitted from a UE to an eNB according to various embodiments of the present disclosure. These PHR formats can be used for the dual connectivity-enabled UE to transmit the PH information for its serving cells to the macro and small eNBs and may include the PH information for all of the serving cells of the UE.

Referring to FIGS. 17A to 17C, the PHR formats may include the PH information according to the PH type. Subsequent to the first octet showing the cell index bitmap for the secondary serving cells, the PH type 2 information of the PCell and pSCell (special SCell having the uplink control channel of the small eNB or among the SCG serving cells) are written first and then the PH type 1 information follows. The PH information may be arranged in the order as shown in FIG. 17A.

The Dual PHR MAC control element is identified by an MAC PDU subheader with LCID. It has a variable size and is defined in at least one of FIGS. 17A, 17B, and 17C. The octet containing Type 2 PH of PCell and the octet including Type 2 PH of PSCell are optionally present depending on simultaneousPUCCH-PUSCH configuration of corresponding MAC entity. If present, they are placed first after the octet indicating the presence of PH per SCell in the order of octet containing Type 2 PH of PCell (if reported), octet with the associated $P_{CMAX,c}$ field (if reported) for the PCell, Type 2 PH of PSCell (if reported) and octet with the associated $P_{CMAX,c}$ field (if reported) for the PSCell. Then follows in ascending order based on the ServCellIndex an octet with the Type 1 PH field and an octet with the associated $P_{CMAX,c}$ field (if reported), for the PCell, for the PSCell and for each SCell indicated in the bitmap.

The Dual PHR MAC Control Element is defined as follows:
$C_i$: this field indicates the presence of a PH field for the SCell with SCellIndex i as specified in [8]. The $C_i$ field set to "1" indicates that a PH field for the SCell with SCellIndex i is reported. The $C_i$ field set to "0" indicates that a PH field for the SCell with SCellIndex i is not reported;

R: reserved bit, set to "0";

V: this field indicates if the PH value is based on a real transmission or a reference format. For Type 1 PH, V=0 indicates real transmission on PUSCH and V=1 indicates that a PUSCH reference format is used. For Type 2 PH, V=0 indicates real transmission on PUCCH and V=1 indicates that a PUCCH reference format is used. Furthermore, for both Type 1 and Type 2 PH, V=0 indicates the presence of the octet containing the associated $P_{CMAX,c}$ field, and V=1 indicates that the octet containing the associated $P_{CMAX,c}$ field is omitted;

Power Headroom (PH): this field indicates the PH level. The length of the field is 6 bits;

P: this field indicates whether the corresponding MAC entity applies power backoff due to power management (as allowed by P-MPR$_c$). The MAC entity shall set P=1 if the corresponding $P_{CMAX,c}$ field would have had a different value if no power backoff due to power management had been applied;

$P_{CMAX,c}$: if present, this field indicates the $P_{CMAX,c}$ or $\tilde{P}_{CMAX,c}$ used for calculation of the preceding PH field.

In the embodiment of FIG. 17B, the reserved bit 'R' of the bitmap of the first octet in FIG. 17A is used for a certain purpose. In the legacy extended PHR, the last bit of the bitmap is reserved. In the embodiments of FIG. 8A, 8B, or 17A in which the new PHR format is used for transmitting full PH information in the dual connectivity environment, the PHR may include the type 2 information of the PCell or the pSCell. However, the type 2 information may be included or not depending on whether the corresponding cell is configured to allow for transmitting the uplink control channel and data channel simultaneously. Even in the case of the extended PHR for the legacy Rel-10 carrier aggregation, whether the type 2 information is carried is notified through higher layer message (RRC signaling). In the dual connectivity environment in which two eNBs perform scheduling independently, however, the simultaneous transmission of the uplink control and data channels incurring the type 2 information may occur at one of or both the eNBs. In the case that each eNB is not aware of the configuration of the peer eNB, the type 2 PH of both the eNBs included as default or the PCG and SCG may be included or not as shown in FIGS. 8A, 8B, and 17A but, when the corresponding PHR MAC CE is received, it may cause error in decoding the message. In order to solve the above problem, the following solution may be considered.

About TYPE 2 PH indication

Alternative 1: to use 'R' bit to indicate whether type 2 PH of the other eNB is included or not.

Alternative 2: use 2 bits (LSB) in the first header (BITMAP) to indicate whether a Type 2 report for PCell and pSCell are present in the report, i.e. if we take the order of appearance in the PHR report first byte would e.g. be: C5T1, C4T1, C3T1, C2T1, C1T1, PScellT2, PcellT2, R.

Alternative 3: however there could be a (small) backward compatibility problem when the UE is configured from non-DC to DC and vice versa. It is preferable to have the location of the different indication bits not change at that point in time (e.g. Cell2 indication bit remains at same position in header byte). Accordingly, an alternative to the order of appearance in the PHR report first byte is: PScellT2, PcellT2, C5T1, C4T1, C3T1, C2T1, C1T1, R.

FIG. 17B shows a PHR MAC CE according to the first of three solutions. If the R bit is set to 1, this means that the PCell (or pSCell) of the cell group is configured with the uplink control and data channels and type 2 PH exists. If the R bit is set to 0, the message is decoded under the assumption of no type 2 PH. If the T bit (R field) of the PHR MAC CE is set to 1, the macro eNB may interpret the PHR MAC CE as shown in FIG. 8A, 8B, or 17A under the assumption that the pSCell of the small eNB is configured with the uplink control and data channels and, otherwise, the message is interpreted under the assumption of no type 2 field.

The Dual PHR MAC control element is identified by an MAC PDU subheader with LCID as specified. It has a variable size and is defined in FIG. 17A. The octet containing Type 2 PH of PCell and the octet containing Type 2 PH of PSCell are optionally present depending on simultaneousPUCCH-PUSCH configuration of corresponding MAC entity. If present, they are placed first after the octet indicating the presence of PH per SCell in the order of octet containing Type 2 PH of PCell (if reported), octet with the associated $P_{CMAX,c}$ field (if reported) for the PCell, Type 2 PH of PSCell (if reported) and octet with the associated $P_{CMAX,c}$ field (if reported) for the PSCell. Then what follows in ascending order based on the ServCellIndex, is an octet with the Type 1 PH field and an octet with the associated $P_{CMAX,c}$ field (if reported), for the PCell, for the PSCell and for each SCell indicated in the bitmap.

The Dual PHR MAC Control Element is defined as follows:

$C_i$: this field indicates the presence of a PH field for the SCell with SCellIndex i as specified in [8]. The $C_i$ field set to "1" indicates that a PH field for the SCell with SCellIndex i is reported. The $C_i$ field set to "0" indicates that a PH field for the SCell with SCellIndex i is not reported;

T: this field indicates the presence of Type 2 PH of the other MAC entity. T field set to "1" indicates that Type 2 PH of the other MAC entity is reported. T field set to "0" indicates that Type 2 PH of the other MAC entity is not reported;

V: this field indicates if the PH value is based on a real transmission or a reference format. For Type 1 PH, V=0 indicates real transmission on PUSCH and V=1 indicates that a PUSCH reference format is used. For Type 2 PH, V=0 indicates real transmission on PUCCH and V=1 indicates that a PUCCH reference format is used. Furthermore, for both Type 1 and Type 2 PH, V=0 indicates the presence of the octet containing the associated $P_{CMAX,c}$ field, and V=1 indicates that the octet containing the associated $P_{CMAX,c}$ field is omitted;

PH: this field indicates the PH level. The length of the field is 6 bits;

P: this field indicates whether the UE applies power backoff due to power management (as allowed by P-MPR$_c$). The UE shall set P=1 if the corresponding $P_{CMAX,c}$ field would have had a different value if no power backoff due to power management had been applied;

$P_{CMAX,c}$: if present, this field indicates the $P_{CMAX,c}$ or $\tilde{P}_{CMAX,c}$ used for calculation of the preceding PH field. The reported PCMAX,c.

Referring to FIGS. 17A to 17C, subsequent to the first octet using as a cell index bitmap for the secondary serving cells to report the PH information, the PH type 2 information of the PCell and pSCell (special SCell having the uplink control channel among the serving cells of the small eNB or the SCG) is written first and then the PH type 1 information follows. The PH type 1 information arrangement order may be determined depending on the cell index.

As described above, the PHR method and apparatus of the present disclosure is advantageous in terms of managing the resources of the UE efficiently and saving power consumption in such a way that the UE reports the PH information to the eNB efficiently in order for the eNB to allocate uplink resources accurately based thereon.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of a terminal in a mobile communication system, the method comprising:
receiving configuration information for a first medium access control (MAC) entity corresponding to a first cell group of a first base station and a second MAC entity corresponding to a second cell group of a second base station;
receiving, from the first base station, an uplink resource allocation for the first cell group;
identifying whether a changed value associated with a maximum power reduction for one of activated cells of the first and the second MAC entities is greater than a predetermined value; and
transmitting, to the first base station, a message including both of a first power headroom report (PHR) corresponding to the first MAC entity and a second PHR corresponding to the second MAC entity, in case that the changed value associated with the maximum power reduction for the one of activated cells of the first and the second MAC entities is greater than the predetermined value, the message further includes information indicating whether the second PHR includes type2 power headroom (PH) of the second MAC entity,
wherein at least one of the first PHR and the second PHR including information on the uplink resource allocation for the first cell group is transmitted from the first base station to the second base station.

2. The method of claim 1, further comprising:
identifying whether a configuration or a reconfiguration for at least one activated cell of the first MAC entity is signaled by higher layer; and
transmitting the first PHR corresponding to the first MAC entity, in case that the configuration or the reconfiguration for the at least one activated cell of the first MAC entity is signaled by the higher layer.

3. The method of claim 1,
wherein the configuration information includes the predetermined value, and
wherein the predetermined value is configured for each of the first cell group and the second cell group.

4. A method of a first base station in a mobile communication system, the method comprising:
transmitting configuration information for a first medium access control (MAC) entity corresponding to a first cell group of the first base station and a second MAC entity corresponding to a second cell group of a second base station to a terminal;

transmitting, to the terminal, an uplink resource allocation for the first cell group;

receiving a message including both of a first power headroom report (PHR) corresponding to the first MAC entity and a second PHR corresponding to the second MAC entity, the message further includes information indicating whether the second PHR includes type2 power headroom (PH) of the second MAC entity; and transmitting, to the second base station, at least one of the first PHR and the second PHR including information on the uplink resource allocation for the first cell group, wherein both of the first PHR and the second PHR are transmitted by the terminal, in case that a changed value associated with a maximum power reduction for one of activated cells of the first and the second MAC entities is greater than a predetermined value.

5. The method of claim 4, further comprising:

receiving the first PHR corresponding to the first MAC entity, wherein the first PHR transmitted by the terminate in case that configuration or reconfiguration for at least one activated cell of the first MAC entity is signaled by the higher layer.

6. The method of claim 4, wherein the configuration information includes the predetermined value, and wherein the predetermined value is configured for each of the first cell group and the second cell group.

7. A terminal in a mobile communication system, the terminal comprising:

a transceiver; and a controller coupled with the transceiver and configured to control to:

receive configuration information for a first medium access control (MAC) entity corresponding to a first cell group of a first base station and a second MAC entity corresponding to a second cell group of a second base station, receive, from the first base station, an uplink resource allocation for the first cell group, identify whether a changed value associated with a maximum power reduction for one of activated cells of the first and the second MAC entities is greater than a predetermined value, and transmit, to the first base station, a message including both of a first power headroom report (PHR) corresponding to the first MAC entity and a second PHR corresponding to the second MAC entity, in case that the changed value associated with the maximum power reduction for the one of activated cells of the first and the second MAC entities is greater than the predetermined value, the message further includes information indicating whether the second PHR includes type2 power headroom (PH) of the second MAC entity, wherein at least one of the first PHR and the second PHR including information on the uplink resource allocation for the first cell group is transmitted from the first base station to the second base station.

8. The terminal of claim 7, wherein the controller is further configured to:

identify whether a configuration or a reconfiguration for at least one activated cell of the first MAC entity is signaled by higher layer; and control the transceiver to transmit the first PHR corresponding to the first MAC entity, in case that the configuration or the reconfiguration for the at least one activated cell of the first MAC entity is signaled by the higher layer.

9. The terminal of claim 7, wherein the configuration information includes the predetermined value, and wherein the predetermined value is configured for each of the first cell group and the second cell group.

10. A first base station in a mobile communication system, the base station comprising:

a transceiver; and a controller coupled with the transceiver and configured to control to:

transmit configuration information for a first medium access control (MAC) entity corresponding to a first cell group of the first base station and a second MAC entity corresponding to a second cell group of a second base station to a terminal, transmit, to the terminal, an uplink resource allocation for the first cell group, receive a message including both of a first power headroom report (PHR) corresponding to the first MAC entity and a second PHR corresponding to the second MAC entity, the message further includes information indicating whether the second PHR includes type2 power headroom (PH) of the second MAC entity, and transmit, to the second base station, at least one of the first PHR and the second PHR including information on the uplink resource allocation for the first cell group, wherein both of the first PHR and the second PHR are transmitted by the terminal, in case that a changed value associated with a maximum power reduction for one of activated cells of the first and the second MAC entities is greater than a predetermined value.

11. The first base station of claim 10, wherein the controller is further configured to receive the first PHR corresponding to the first MAC entity, and wherein the first PHR is transmitted by the terminal, in case that configuration or the reconfiguration for at least one activated cell of the first MAC entity is signaled by the higher layer.

* * * * *